US006613816B2

(12) United States Patent
Mahdi et al.

(10) Patent No.: US 6,613,816 B2
(45) Date of Patent: Sep. 2, 2003

(54) CURE ON DEMAND ADHESIVES AND WINDOW MODULE WITH CURE ON DEMAND ADHESIVE THEREON

(75) Inventors: Syed Z. Mahdi, Rochester Hills, MI (US); Renhe R. Lin, Stevenson Ranch, CA (US); Dwight K. Hoffman, Midland, MI (US); Gordon M. Parker, deceased, late of Fort Lee, NJ (US); by Michael Parker, legal representative, New York, NY (US); Harry W. Hsieh, Troy, MI (US)

(73) Assignee: The Dow Chemical Company, Midland, MI (US)

( * ) Notice: Subject to any disclaimer, the term of this patent is extended or adjusted under 35 U.S.C. 154(b) by 161 days.

(21) Appl. No.: 09/875,986

(22) Filed: Jun. 7, 2001

(65) Prior Publication Data

US 2002/0010272 A1 Jan. 24, 2002

Related U.S. Application Data

(62) Division of application No. 09/300,342, filed on Apr. 27, 1999, now Pat. No. 6,355,127.
(60) Provisional application No. 60/083,125, filed on Apr. 27, 1998.

(51) Int. Cl.$^7$ .......................... C08G 77/08; C08K 9/10
(52) U.S. Cl. .................... 523/202; 523/211; 528/18
(58) Field of Search ................. 523/202, 211; 528/18

(56) References Cited

U.S. PATENT DOCUMENTS

| | | | |
|---|---|---|---|
| 3,317,433 A | 5/1967 | Eichel | 252/316 |
| 3,879,241 A | 4/1975 | Butler | 156/108 |
| 3,971,751 A | 7/1976 | Isayama et al. | 260/37 |
| 4,091,130 A | 5/1978 | Shaw | 427/358 |
| 4,100,148 A | 7/1978 | Hockenberger et al. | 528/374 |
| 4,222,925 A | 9/1980 | Bryant et al. | 260/37 |
| 4,282,387 A | 8/1981 | Olstowski et al. | 568/618 |
| 4,302,571 A | 11/1981 | Arai et al. | 528/32 |
| 4,326,047 A | 4/1982 | Yates | 525/507 |
| 4,345,053 A | 8/1982 | Rizk et al. | 525/440 |
| 4,367,313 A | 1/1983 | Rizk et al. | 525/102 |
| 4,396,681 A | 8/1983 | Rizk et al. | 428/423 |
| 4,421,897 A | 12/1983 | Gutekunst et al. | 525/119 |
| 4,444,974 A | 4/1984 | Takase et al. | 258/33 |
| 4,461,854 A | 7/1984 | Smith | 523/211 |
| 4,474,933 A | 10/1984 | Huber et al. | 528/26 |
| 4,503,161 A | 3/1985 | Korbel et al. | 502/159 |
| 4,507,469 A | 3/1985 | Mita et al. | 528/425 |
| 4,517,337 A | 5/1985 | Lockhart et al. | 524/859 |
| 4,528,354 A | 7/1985 | McDougal | 528/33 |
| 4,571,278 A | 2/1986 | Kunert | 156/108 |
| 4,604,444 A | 8/1986 | Donnadieu et al. | 528/34 |
| 4,622,369 A | 11/1986 | Chang et al. | 525/440 |
| 4,625,012 A | 11/1986 | Rizk et al. | 528/28 |
| 4,645,816 A | 2/1987 | Pohl et al. | 528/28 |
| 4,758,648 A | 7/1988 | Rizk et al. | 528/53 |
| 4,766,176 A | 8/1988 | Lee et al. | 525/100 |
| 4,788,170 A | 11/1988 | Wengrovius | 502/125 |
| 4,788,254 A | 11/1988 | Kawakubo et al. | 525/100 |
| 4,837,401 A | 6/1989 | Hirose et al. | 525/364 |
| 4,879,853 A | 11/1989 | Braendle et al. | 52/208 |
| 4,889,903 A | 12/1989 | Baghdachi | 528/17 |
| 4,933,032 A | 6/1990 | Kunert | 156/108 |
| 4,954,472 A | 9/1990 | Scott et al. | 502/152 |
| 4,965,311 A | 10/1990 | Hirose et al. | 524/483 |
| 4,990,392 A | 2/1991 | Groshens et al. | 428/196 |
| 5,010,119 A | 4/1991 | McElrath, Jr. et al. | 523/205 |

(List continued on next page.)

FOREIGN PATENT DOCUMENTS

| | | | |
|---|---|---|---|
| CA | 2113961 | 1/1994 | C09J/143/04 |
| EP | 0 070 475 A2 | 1/1983 | C08G/18/71 |
| EP | 0 363 006 A2 | 9/1989 | C08J/3/24 |
| EP | 0 525 769 A1 | 2/1993 | C08G/65/32 |
| EP | 0 532 048 A1 | 3/1993 | C08G/65/32 |
| EP | 0 538 880 A2 | 4/1993 | C08G/65/32 |
| WO | 92/13901 | 8/1992 | C08F/8/00 |
| WO | 94/18255 | 8/1994 | C08G/18/10 |
| WO | 96/27641 | 9/1996 | C08L/101/00 |
| WO | 98/11166 | 3/1998 | C08L/101/00 |

OTHER PUBLICATIONS

Derwent Abstract, Crosslink Modified Polyolefin Mold Composition Comprise Mixture Encapsulate Silanol Condensation Catalyst Silane Modified Polyolefin, JP 530092857.

What is Kaneka MS Polymer and Kaneka Silyl?, Landec Corporation, May 19, 1999, pp. 1–14.

MS–Polymertechnologie; MS Polymer Technology, Dr. Ir. R. Oosting, 1997, pp. 1–5.

Intelimer Polymers, Intelimer 5012, Landec Corporation Apr. 27, 1998.

Derwent Abstract, JP05331130, Prepn. of Isocyanate (Oligomer) Dispersion.

Primary Examiner—Margaret G. Moore
(74) Attorney, Agent, or Firm—Norman L Sims

(57) ABSTRACT

In one embodiment the invention is An adhesive composition comprising
  a) a polymer having a flexible backbone and a reactive moiety capable of cross-linking,
  b) a particle comprising an active agent encapsulated in an encapsulating agent wherein the active agent comprises a catalyst for cross-linking of the reactive moiety, a curing agent for the reactive moiety, an accelerator for the curing reaction or a mixture thereof;

and the encapsulating agent comprises a side chain crystallizable polymer wherein the active agent is not substantially extractable from the particle at ambient conditions in a first extraction after particle formation.

14 Claims, No Drawings

U.S. PATENT DOCUMENTS

| | | | |
|---|---|---|---|
| 5,051,521 A | 9/1991 | Frances et al. | 556/94 |
| 5,063,270 A | 11/1991 | Yukimoto et al. | 524/306 |
| 5,068,304 A | 11/1991 | Higuchi et al. | 528/28 |
| 5,075,468 A | 12/1991 | Frances et al. | 556/87 |
| 5,084,543 A | 1/1992 | Frances et al. | 528/58 |
| 5,102,969 A | 4/1992 | Scheffler et al. | 528/48 |
| 5,120,349 A | 6/1992 | Stewart et al. | 71/93 |
| 5,129,180 A | 7/1992 | Stewart | 47/57.6 |
| 5,137,770 A | 8/1992 | Rothe et al. | 428/192 |
| 5,194,460 A | 3/1993 | Evans et al. | 523/211 |
| 5,310,786 A | 5/1994 | Vorlop et al. | 525/54.1 |
| 5,330,597 A | 7/1994 | Lenchten et al. | 156/108 |
| 5,342,914 A | 8/1994 | Iwakiri et al. | 528/32 |
| 5,438,181 A | 8/1995 | Volkmann et al. | 219/601 |
| 5,539,045 A | 7/1996 | Potts et al. | 524/588 |
| 5,554,709 A | 9/1996 | Emmerling et al. | 528/27 |
| 5,601,761 A | 2/1997 | Hoffman et al. | 264/4.3 |
| 5,620,648 A | 4/1997 | Volkmann et al. | 264/511 |
| 6,054,001 A | 4/2000 | Swanson et al. | 156/108 |
| 6,224,793 B1 * | 5/2001 | Hoffman et al. | 264/4.1 |

* cited by examiner

CURE ON DEMAND ADHESIVES AND WINDOW MODULE WITH CURE ON DEMAND ADHESIVE THEREON

CROSS-REFERENCE TO RELATED APPLICATION

This application is a divisional application of application Ser. No. 09/300,342, filed Apr. 27, 1999 and now U.S. Pat. No. 6,355,127 and claims the benefit of U.S. Provisional Application No. 60/083,125 filed on Apr. 27, 1998.

This application relates to a cure on demand adhesive composition. The application further relates to a glass module having the cure on demand adhesive in an uncured state on a portion of the glass module. The application further relates to a process for bonding glass, such as window glass, to other substrates, such as buildings and automobiles.

Window glass is presently fixed into automobiles in the automobile assembly plants. A primer composition is applied to the window glass in the vicinity of where the adhesive is applied. A primer such as one disclosed in U.S. Pat. No. 5,115,086 or U.S. Pat. No. 5, 238,993 (both incorporated herein by reference) is applied to the window flange into which the glass is to be bonded. A bead of a polyurethane adhesive, such as disclosed in U.S. Pat. No. 4,758,648 and U.S. Pat. No. 4,780,520 (both incorporated herein by reference), is applied to the portion of the window to be contacted with the automobile window flange. The window is then placed in the window flange with the polyurethane adhesive composition between the glass and the automobile window flange. Typically the polyurethane adhesive cures upon exposure to moisture and after a period of time has sufficient strength to hold the window into the automobile under conditions of an impact at about 35 miles per hour.

This process is labor intensive requiring several steps in an automobile plant and requires the use of volatile chemicals in an automobile plant. To perform all of these operations in the vicinity of the assembly line requires a large amount of factory floor space.

It has been proposed to apply the primer and adhesive to the glass at a point remote from the automobile assembly line. U.S. Pat. No. 5,330,597 and U.S. Pat. No. 4,879,853 (both incorporated herein by reference) disclose methods for protecting the moisture curing polyurethane adhesive from exposure to atmospheric moisture curing. These approaches have not had commercial success as this requires removal of a protective layer strip from the adhesive in the automobile plant which requires additional time and complicates application.

World Patent 94/18255 discloses a storable modular construction element such as a storable glass module wherein a strip of a latent reactive adhesive is disposed around the periphery of the glass module. The latent reactive adhesive mainly contains one or more polyurethanes with blocked isocyanate groups, one or more polyurethane precursors constituted of polyols and/or polyamines encapsulated polyisocyanates or one or more polyurethanes with a radically polymerizable group. The adhesive disclosed in World Patent 94/18255 does not exhibit long term stability and rapid activation. Therefore, there has been no commercial utilization of this concept.

What is needed is a cure on demand adhesive which is stable when exposed to atmospheric conditions for up to five days, which contains a catalyst or curing agent which can be activated quickly, and preferably in less than 10 minutes, more preferably less than 3 minutes, has adequate green strength to hold a glass module into a substrate such as an automobile window without sagging, exhibits rapid enough cure such that a automobile into which such a window glass module is affixed, can be driven away in less than 3 hours from the time at which the window is affixed into the automobile, that the adhesive has sufficient strength after cure to meet the United States federal guidelines for bonding an automobile window into an automobile, and allows application of the adhesive remote from the automobile assembly plant. What is further needed is a window module with such a cure on demand adhesive placed thereon which meets such requirements. What is further needed is a process for bonding a window into a structure using such a cure on demand adhesive.

SUMMARY OF INVENTION

In one embodiment the invention is; an adhesive composition comprising
  a) a polymer having a reactive moiety capable of cross-linking,
  b) a particle comprising an active agent encapsulated in an encapsulating agent wherein the active agent comprises a catalyst for cross-linking of the reactive moiety, a curing agent for the reactive moiety, an accelerator for the curing reaction or a mixture thereof;
    and the encapsulating agent comprises a thermoplastic or crystallizable polymer wherein the active agent is not substantially extractable from the particle at ambient conditions in an extraction after particle formation.

Preferably the crystalline or thermoplastic polymer has a transition point of from about 40° C. to about 250° C. and the active agent does not volatilize at conditions under which it is exposed during encapsulation.

An adhesive composition comprising an alkylene oxide based polymer having a reactive silicon moiety bound thereto and a silanol condensation catalyst encapsulated in an encapsulating agent having a transition point of from about 40° C. to about 250° C.

In yet another embodiment the invention is a process for binding two substrates together which comprises contacting one of the substrates with an adhesive as described herein, exposing the adhesive to conditions such that the active agent is released so as to contact the active agent with the polymer, contacting the two substrates such that the adhesive is located between the two substrates, and exposing the adhesive between the substrates to curing conditions. In a preferred embodiment of this process the adhesive is activated by exposure to an infrared heating source.

In yet another embodiment the invention is window module useful in an automobile comprising
  a substrate which is useful as a window which has applied to the portion of the window which is to be bound into a structure an uncured adhesive as described herein. In another embodiment the invention is a process for mounting a window into a structure which comprises a) applying an adhesive as described herein in the form of a profiled strip about the periphery of one face of a window in a location remote from the location wherein the window is to be placed in the substrate, wherein the adhesive is in an uncured or partially uncured state; b) transporting the window with the adhesive strip applied thereto to the location where the window is to be mounted into the structure; c) performing an operation upon the adhesive to activate curing of the adhesive; d) mounting the window into the structure such that the adhesive contacts the window and substrate; e) allowing the adhesive to cure such that the window is bonded into the substrate.

The cure on demand adhesive of the invention exhibits sufficient stability when exposed to atmospheric conditions such that it will not cure for a period of up to 5 days or more. Furthermore, the adhesive of the invention can be activated relatively quickly and preferably within 10 minutes or less and more preferably within 3 minutes or less. The cured adhesive bond exhibits a tensile strength upon cure of about 250 psi (1.72 mPa) or greater, preferably about 400 psi (2.76 mPa) and most preferably about 500 psi (3.45 mPa). The adhesive of the invention demonstrates adequate green strength to hold the window into an automobile window frame or building structure without sagging. Further the adhesive of the invention demonstrates rapid cure in that the adhesive cures sufficiently such that an automobile into which a window is affixed with such adhesive can be driven within about 3 hours after mounting the window into the automobile. The adhesive of the invention has sufficient tensile strength and elongation properties to meet the United States Motor Vehicle Safety guidelines relative to bonding of windshields in automobiles. Furthermore, window module with the adhesive applied thereto exhibits all of the aforementioned properties.

DETAILED DESCRIPTION OF THE INVENTION

The adhesive composition of the invention contains a polymer having a reactive moiety capable of cross-linking. The polymer can be any polymer known to those skilled in the art with reactive moieties which can be cured and which can be used as an adhesive. Preferably the polymer has a flexible backbone. The polymer having a flexible backbone can be any polymer which exhibits elastomeric properties. The reactive moiety can be any reactive moiety which can undergo cross-linking and which can impart significant tensile strength to the cured adhesive composition. The polymer is preferably a polyurethane polymer having isocyanate functionality, hydroxyl functionality or olefinic unsaturation capable of polymerization by free radical; a polymerization flexible epoxy resin; a polyether having silane moieties capable of silanol condensation; a polyether having silane moieties capable of cross-linking by hydrosilylation, an acrylate functional polymer having a flexible backbone, a polyolefin having silane moieties capable of either silanol condensation or cross-linking by hydrosilylation, a polyurethane having one or more silane moieties capable of silanol condensation, a polyurethane having one or more silane moieties capable of cross-linking by hydrosilylation, and the like. Preferably the flexible polymer is a polyurethane prepolymer having isocyanate functionality, a flexible epoxy resin or a polyether having silane moieties capable of silanol condensation.

Even more preferably the polymer is a polyether having silane moieties capable of silanol condensation. In one embodiment the polymer useful in the invention is a polymer as disclosed in Yukimoto et al., U.S. Pat. No. 4,906,707, Iwakiri et al. U.S. Pat. No. 5,342,914, Yukimoto U.S. Pat. No. 5,063,270, Yukimoto et al. U.S. Pat. No. 5,011,900, Suzuki et al. U.S. Pat. No. 5,650,467 all incorporated herein by reference. More preferably such polymers are oxyalkylene polymers containing at least one reactive silicon group per molecule. The oxyalkylene polymer which can be used in the present invention includes polymers having a molecular chain represented by formula (1):

$$—(R—O)_n— \tag{1}$$

wherein R represents a divalent alkylene group having 2 to 4 carbon atoms, and preferably 2 to 3 carbon atoms; and n represents the number of repeating units. The oxyalkylene polymer may have a straight chain or a branched structure, or a mixed structure thereof. From the viewpoint of availability an oxyalkylene polymer having a repeating unit represented by formula (2) is preferred:

$$—CH(CH_3)CH_2O— \tag{2}$$

The polymer may contain other monomer units but preferably comprises the monomer unit of formula (1) in a proportion of at least about 50 percent by weight, particularly about 80 percent by weight or more. Oxyalkylene polymers having a number average molecular weight (Mn) of about 3,000 or more are preferred. Those having an Mn of about 3,000 to about 50,000 are even more preferred, and about 3,000 to about 30,000, are most preferred. Preferably the ratio (Mw/Mn) of weight average molecular weight (Mw) to number average molecular weight (Mn) is not higher than about 1.6, which indicates that the polymer has an extremely narrow molecular weight distribution (i.e., it is highly monodisperse). The Mw/Mn ratio is more preferably not higher than about 1.5, and most preferably not higher than about 1.4. While molecular weight distribution is measurable by various methods, it is generally measured by gel-permeation chromatography (GPC).

The terminology "reactive silicon group or capable of silanol condensation" means a silicon-containing group in which a hydrolyzable group or a hydroxyl group is bonded to the silicon atom and which is cross-linkable through silanol condensation reaction. While not limited thereto, typical reactive silicon groups are represented by formula (3):

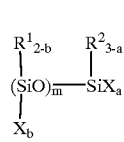

(3)

wherein $R^1$ and $R^2$ each represent an alkyl group having 1 to 20 carbon atoms, an aryl group having 6 to 20 carbon atoms, an aralkyl group having 7 to 20 carbon atoms or a triorganosiloxy group represented by $(R')_3SiO—$, wherein each of the three R' groups, which may be the same or different represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X is independently in each occurrence a hydroxyl group or a hydrolyzable group; a is independently in each occurrence 0, 1, 2, or 3; and b is independently in each occurrence 0, 1 or 2; and m represents 0 or an integer of from 1 to 19; wherein a and b are chosen to satisfy the relationship $a+\Sigma b \geq 1$.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy group, a mercapto group, and an alkenyloxy group. An alkoxy group, is more preferred with a methoxy or ethoxy group being most preferred, for ease in handling due to its mild hydrolyzablility. One to three hydroxyl groups or hydrolyzable groups may be bonded to one silicon atom, and (a+Σb) is preferably 1 to 5. Where two or more hydroxyl groups or hydrolyzable groups are present per reactive silicon group, they may be the same or different. The reactive silicon group may have one or more silicon atoms. A reactive silicon group in which silicon atoms are linked to form siloxane bondings may have as much as 20 silicon atoms. From the standpoint of availability, reactive silicon groups represented by formula (4) shown below are preferred:

(4)

wherein $R^1$, X, and a are as defined above. $R^1$ and $R^2$ are preferably an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R')_3SiO$— in which R' is methyl or phenyl. $R^1$, $R^2$, and R' are most preferably a methyl group.

The oxyalkylene polymer contains at least one, and preferably about 1.1 to about 6 reactive silicon groups per molecule. If the number of the reactive silicon group per molecule is less than 1, the polymer has insufficient curability, failing to achieve satisfactory rubbery elasticity. The reactive silicon group may be placed either at the terminal or in the inside of the molecular chain of the oxyalkylene polymer. An oxyalkylene polymer having the reactive silicon group at the molecular terminal thereof tends to provide a rubbery cured product having high tensile strength and high elongation.

The oxyalkylene polymer having a reactive silicon group is preferably obtained by introducing a reactive silicon group into the above-mentioned oxyalkylene polymer having a functional group. Processes for the preparation of such oxyalkylene polymers are disclosed in the U.S. Patents previously incorporated herein by reference. Such oxyalkylene polymers containing at least one reactive silicone group per molecule may also be reacted with other groups or polymers reactive with such oxyalkylene polymer as disclosed in the above mentioned U.S. Patents.

In another embodiment, the flexible polymer used in the adhesive composition is a silyl terminated prepolymer prepared by contacting a polyol as described hereinafter with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst.

Polyols which may be used to prepare the silyl terminated prepolymer include polyols useful in preparing polyurethane prepolymers useful in adhesive and elastomer applications and are well known to those skilled in the art. Bhat et al. U.S. Pat. No. 5,672,652, see column 4, lines 5 to 60, (relevant parts incorporated herein by reference) discloses the preferred polyols useful in preparing the silane terminated prepolymers. The polyols are prepared by reacting an initiator, a compound having one or more active hydrogen atoms, with an alkylene oxide in the presence of a suitable catalyst under appropriate conditions for the alkylene oxide to react with one or more active hydrogen moieties of the initiator so as to add a series of ether units to the initiator thereby preparing a polyol. Initiators which are useful in this invention are well known to those skilled in the art. Preferable initiator compounds which are employed to prepare the polyols are compounds having 1 to 8 active hydrogens, preferably 2 to 8, more preferably 2 to 4, and most preferably 2 to 3 active hydrogens. Preferable initiator compounds include, for example, alcohols, glycols, low molecular weight polyols, glycerin, trimethylol propane, pentaerythritol, glycosides, sugars, ethylene diamine, diethylenetriamine, and the like. Particularly suitable glycols include, for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,6-pentylene glycol, neopentyl glycol and various hexane diols, mixtures thereof and the like. Alkylene oxides useful include ethylene oxide, propylene oxide, 1,2-butylene oxide, 2,3-butylene oxide, or mixtures thereof. Most preferred alkylene oxides are ethylene oxide and propylene oxide with propylene oxide most preferred. Combinations of the above mentioned alkylene oxides may be used in random or block polymers.

Preferably, the polyols used in preparing the silane terminated prepolymers are high molecular weight polyols prepared by the process which comprises first, contacting one or more initiators with one or more alkylene oxides in the presence of a catalyst comprising calcium having counterions of carbonate and a $C_6$ to $C_{10}$ alkanoate in a solvent which does not contain active hydrogen atoms. The mixture is exposed to conditions at which the alkylene oxides react with the compound containing more than one active hydrogen atom. Preferably the process is performed such that a polyol is prepared which has an equivalent weight of from about 1,000 to about 20,000, a polydispersity of about 1.2 or less and a residual calcium level of from about 0 to about 2,000 parts per million (ppm). The preferred catalyst used in preparing the polyols is a calcium catalyst which contains both carbonate and $C_6$ to $C_{10}$ alkanoate counterions. The catalyst is dispersed or dissolved in a dispersant or solvent which has no active hydrogen atoms capable of initiating a polyether. Preferably, the solvent or dispersant is a hydrocarbon or mixture of hydrocarbons and more preferably, mineral spirits. Preferably the alkanoate counterions are $C_8$ residues of organic acids. In a preferred embodiment the alkanoates are derived from substantially pure organic carboxylic acids. Preferably the pure carboxylic acids are synthetic, as synthetic carboxylic acids generally exhibit higher purities. The carbonate counterions result from the contacting of the calcium and the organic carboxylic acid with carbon dioxide. The ratio of calcium ions to carboxylic acid ions is from about 1.0:0.5 to about 1.0:1.0 Preferably the ratio is from about 1.0:0.5 and about 1.0:0.9. The catalysts may be prepared by contacting the appropriate ratio of calcium hydroxide with a $C_{6\text{-}10}$ carboxylic acid and bubbling carbon dioxide through the mixture to form carbonate moieties. In the preparation of the preferred high molecular weight polyols, the initiator and alkylene oxides are generally contacted without the use of the solvent. Typically such contacting takes place in the absence of oxygen and atmospheric moisture, under an inert atmosphere, such as nitrogen or argon. The ratio of initiator to polyol is chosen to achieve the desired molecular weight or equivalent weight of the polyol. This ratio can be readily calculated by one skilled in the art. The amount of catalyst used is sufficient such that the residual catalyst remaining in the polyol upon completion of the reaction is about 0 parts per million or greater more preferably about 200 parts per million or greater, even more preferably about 300 parts per million or greater and most preferably about 400 parts per million or greater, and preferably about 2,000 parts per million or less, more preferably about 1,000 parts per million or less, even more preferably about 800 parts per million or less and most preferably about 400 parts per million or less. In some embodiments it may be desirable to remove all of the residual catalyst where the catalyst is not needed for a further reaction and where the catalyst may impact the properties of the ultimate adhesive. This can be achieved by contacting the polyether polyol of the invention with magnesium silicate or phosphoric acid and filtering the polyol with diatomaceous earth. The complex of the calcium catalyst and the additives are removed on the filter material. In those embodiments where the calcium is removed the resulting parts per million of the catalyst remaining in the polyol can be about 0.

The reactants are reacted at a temperature of about 90° C. or greater, more preferably about 100° C. or greater and most preferably about 110° C. or greater, and preferably at a temperature of about 150° C. or less, more preferably about 130° C. or less and most preferably about 120° C. or less. The reactants are contacted for a time sufficient to prepare the desired high molecular weight polyol. The reaction time is controlled by the feed rate, reactor size, catalyst concentration and temperature. One skilled in the art can determine the appropriate time based on these variables. The unreacted polyols and initiators may be removed from the reaction by stripping them off using means well known to those skilled in the art.

The polyether polyol preferably has an weight average molecular weight of about 2,000 or greater, more preferably about 3,000 or greater, even more preferably about 6,000 or greater and most preferably about 10,000 or greater. The resulting polyether polyol preferably has a weight average molecular weight of about 20,000 or less, more preferably about 16,000 or less, even more preferably about 14,000 or less and most preferably about 12,000 or less. The resulting high molecular weight polyol preferably has a polydispersity of about 1.2 or less and more preferably about 1.12 or less. Preferably the polyol used in the invention corresponds to Formula 5.

$$R^3-((CH(R^4)CH(R^4)O)_q-H)_p \quad (5)$$

wherein:

R$^3$ is the residue of a compound having from about 1 to about 8 hydrogen atoms;

R$^4$ is independently in each occurrence is a C$_{1-6}$ saturated or unsaturated hydrocarbon chain;

q is independently in each occurrence a number such that the equivalent weight of the polyol is from about 1,000 to about 20,000; and p is independently in each occurrence from about 1 to 8. Preferably R$^3$ is a C$_{1-8}$ alkyl or cycloalkyl moiety or oxygen. More preferably, R$^3$ is a C$_2$ to C$_4$ alkyl group or oxygen. R$^4$ is preferably hydrogen, methyl or ethyl and most preferably hydrogen or methyl. q is independently in each occurrence a number such that the equivalent weight of the polyol is from about 2,000 to about 16,000, more preferably from about 5,000 to about 16,000 and more preferably from about 10,000 to about 14,000. p is preferably 4 or less and more preferably 3 or less.

The polyols also demonstrate a low unsaturation level, preferably about 0.04 milliequivalents of unsaturation per gram of polyol or less and more preferably about 0.02 milliequivalents of unsaturation per gram of polyol or less.

Also included as useful polyols in this embodiment are polymers having a polyolefin backbone and terminal hydroxyl groups. Examples of such polyols are Kraton™ polyethylene/butylene polymers having terminal hydroxyls such as Kraton™ Liquid L-2203 polymer.

The polyols can be reacted with an isocyanato silane to prepare reactive silicone functional prepolymers. Such isocyanato silane requires a silane group with a hydrolyzable moiety attached thereto. Isocyanato silanes useful in the invention are described in U.S. Pat. No. 4,618,656 at column 3, lines 24 to 34 incorporated herein by reference. Preferably such isocyanato silanes correspond to formula 6.

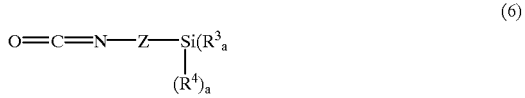

(6)

wherein a, R$^1$ and X are as defined hereinbefore. Z is independently in each occurrence a C$_{1-40}$ divalent hydrocarbyl moiety. Z is preferably a C$_{1-20}$ divalent hydrocarbyl moiety, preferably C$_{1-10}$ alkylene, more preferably C$_{1-3}$ alkylene and most preferably methylene.

The reaction of the polyol with an organo functional silane can be performed using conventional processes such as those disclosed in U.S. Pat. No. 4,625,012 incorporated herein by reference. The use of the high molecular weight polyols described above allow the preparation of silane terminated polyethers by the reaction of isocyanato silanes with the polyols without the addition of additional catalysts. The residual calcium catalyst from the polyol formation reaction sequence is sufficient to catalyze the reaction. If desired, a standard polyurethane catalyst such as those disclosed in U.S. Pat. No. 4,625,012 at column 5, lines 14 to 23 may be added.

It is disadvantageous to add such catalysts as this impacts the stability of the prepolymer prepared. It has been discovered that when the prepolymer is prepared in the absence of standard polyurethane catalysts, it is stable to hydrolysis if exposed to atmospheric moisture. The reaction of the isocyanato silane with a polyol can take place at a temperature of about 0° C. or greater more preferably about 25° C. or greater, and preferably 150° C. or less and most preferably 80° C. or less. This reaction is preferably performed under an inert atmosphere. The reaction is allowed to proceed until the desired silane functionality is achieved. Where a high molecular weight polyol is used it is preferred that a sufficient of amount isocyanato silane be used to react with all of the hydroxyl functionality of the polyol. In this embodiment the resulting prepolymer exhibits excellent physical properties and stability. Where the polyol used is a lower molecular weight polyol. It is desirable to use less than a stoichiometric amount of isocyanatosilane as compared to hydroxyl moieties, such that the resulting product has some residual hydroxyl moieties in the prepolymer prepared. This results in a product which has better physical properties at cure. In this embodiment, the ratio of hydroxyl moieties to the isocyanate moieties of the isocyanato silane is preferably from about 0.75:1.0 to 0.95:1.0. In the embodiment where the residual calcium level remains in the prepolymer it maybe desirable to neutralize the calcium in the prepolymer. The presence of calcium under certain circumstances can cause the prepolymer to cross-link which is evidenced by viscosity growth. The residual calcium can be removed by contacting the prepolymer with an acid to neutralize the calcium. A sufficient amount of acid should be used to neutralize the calcium. The amount of acid needed can be determined by measuring the basicity of the prepolymer. Enough acid should be added to render the prepolymer slightly acidic. A strong acid such as hyrochloric acid can be used.

In another embodiment, the flexible polymer can be a polyurethane based polymer having 1 or more reactive silane moieties such as disclosed in U.S. Pat. No. 5,554,709 incorporated herein by reference. In another embodiment, the polymer can be a polyurethane having active hydrogen containing functionality or isocyanate functionality. Preferably the polyurethane has isocyanate functionality. Polyurethane prepolymers useful in this invention include those disclosed in U.S. Pat. No. 5,672,652 at column 2, line 35 to column 5, line 20, incorporated herein by reference. In a preferred embodiment, the polyurethane prepolymer is prepared from aliphatic isocyanates.

In yet another embodiment, the polymer used in the adhesive can be an epoxy resin and preferably a flexible epoxy resin. Such epoxy resins and flexible epoxy resins, are well known to those skilled in the art. Flexible epoxy resins as used herein refer to epoxy resins having elastomeric chains in the backbone. Representative of such elastomeric chains are polyether chains which are preferably prepared from one or more alkylene oxides representative examples of these flexible epoxy resins are those described in U.S. Pat. No. 5,308,895 at column 8, line 9 and formula 9 and the description thereof following, incorporated herein by reference. Preferably the flexible epoxy resin is derived from an ethylene oxide, propylene oxide or a mixture thereof. Examples of such polyether based epoxy resins include DER 732™ and DER™736 epoxy resins available from The Dow Chemical Company.

In another embodiment the polymer may be a polyurethane based backbone having hydrolyzable silane groups. Such materials are disclosed in Chang U.S. Pat. No. 4,622, 369 and Pohl U.S. Pat. No. 4,645,816. Relevant portions incorporated herein by reference.

In another embodiment the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, Column 12 line 38 to 61, U.S. Pat. No. 3,971,751; U.S. Pat. No. 5,223,597; U.S. Pat. No. 4,923,927; U.S. Pat. No. 5,409,995 and U.S. Pat. No. 5,567,833 incorporated herein by reference. The polymer prepared can be cross-linked in the presence of a hydrosilylation crosslinking agent and hydrosilylation catalyst as described in U.S. Pat. No. 5,567,833 at column 17 lines 31 to 57 and U.S. Pat. No. 5,409, 995 incorporated herein by reference.

In another embodiment the flexible polymer backbone can have acrylate functionality. Polymers with acrylate functionality are well known in the art. In one embodiment a polyol, for instances polyether polyol can be converted to an acrylate functional polymer by reacting the polyol with an isocyanato acrylate or methacrylate. This type of polymer can be cured by a free radical catalyst as described herein.

In another embodiment, the polymer can be a polyurethane having olefinic unsaturation. Examples of such polymers are disclosed in Hung, U.S. Pat. No. 5,063,269 incorporated herein by reference.

The prepolymer is present in the adhesive composition in sufficient amount such that the adhesive is capable of bonding two substrates together, such as one or more of glass, wood, metal, plastic, a composite and fiberglass. Preferably the first substrate is glass and the other is metal, plastic, fiberglass or composite. Preferably the substrates are painted and more preferably the substrates are painted with acid resistant paints such as oxylic melamine silane modified coatings (DuPont Gen IV paints) melamine carbonate coatings, two-part urethane coatings or acid epoxy coatings. The adhesives are especially good for bonding windows to acrylic melamine silane modified coatings (DuPont Gen IV paints), even without a paint primer. More preferably the prepolymer is present in an amount of about 30 percent by weight or greater based on the weight of the adhesive, even more preferably about 50 percent by weight or greater and most preferably about 70 percent by weight or greater. More preferably the prepolymer is present in an amount of about 99.8 percent by weight or less based on the weight of the adhesive and most preferably about 85 percent by weight or less.

The adhesive composition further comprises a catalyst for the curing of the reactive moiety on the polymer, a curing agent for the reactive moiety on the polymer an accelerator for the cure reaction of the polymer or a mixture thereof, (hereinafter collectively active agent). Such an active agent is encapsulated in a crystallizable or thermoplastic polymer as the encapsulating agent. Preferably the active agent is dispersed in the encapsulating agent and is not chemically bound to the encapsulating agent.

The active agent may be any material that dissolves in or forms heterogeneous slurry with the encapsulating material at temperatures at which the encapsulating agent is in the liquid form, i.e., molten. Preferably the active agent is soluble in the encapsulating material. The active agent may either be a liquid or a solid at room temperature but it is preferably a liquid at processing temperatures. The melting point of the active agent may be greater than, less than, or equal to the melting point of the encapsulating material. Preferably the active agent does not volatilize or degrade under the temperatures of encapsulation process. Preferably the active agent is a silanol condensation catalyst; a hydrosilylation catalyst, a catalyst, curing agent or accelerator useful in preparing prepolymers or thermoset resins such as, polyurethane prepolymers and compositions, epoxy resins, vinyl ester resins, polyester resins, allylic resins, acrylate resins, polysulfide resins, phenolic resins, or amino resins and the like.

In one preferred embodiment the active agent is an organo metallic catalyst which does not volatize or volatilize or degrade under the conditions of encapsulation. Other catalytic species which maybe useful are catalysts which promote the moisture curing of polyurethane prepolymers. Catalysts useful in polyurethane reactions include tin carboxylates, organo silicon titinates, alkyl titinates, bis carboxylates, tertiary amines, tin mercaptides, napthenates or alkanoate salts of lead, cobalt, manganese, bismuth or iron. Catalysts useful are well known to those skilled in the art and many examples may be found, e.g., in the POLYURETHANE HANDBOOK, Chapter 3, §3.4.1 on pages 90–95; and in POLYURETHANE CHEMISTRY AND TECHNOLOGY, in Chapter IV, pages 129–217.

Preferred tin compounds include tin(II)salts of organic carboxylic acids, such as tin(II) diacetate, tin(II) dioctanoate, tin(II) diethylhexanoate and tin(II) dilaurate; dialkyltin(IV) salts of organic carboxylic acids, such as dibutyltin diacetate, dibutyltin dilaurate, dibutyltin maleate and dioctyltin diacetate; and stannous salts of carboxylic acids, such as stannous octoate, stannous oleate, stannous acetate, and stannous laureate.

Other catalysts used for promoting the curing of polyurethanes include: amidines, such as 2,3-dimethyl-3,4,5,6-tetrahydropyrimidine; tertiary amines, such as triethylamine, tributylamine, dimethylbenzylamine, N-methyl-, N-ethyl-, or N-cyclohexylmorpholine, N,N,N'N,N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and, preferably, 1,4-diazabicyclo[2.2.2]octane N-alkylbenzylamines, N-alkylmorpholines, N-alkyl aliphatic polyamines, N-alkylpiperazines and triethylenediamine.

Other active agents which may be used in this invention include silanol condensation catalysts which promote the reaction of the reactive silicon groups. Silanol condensation catalysts are well known in the art and include the following: titanic acid esters, such as tetrabutyl titanate, tetrapropyl titanate, etc.; organotin compounds, such as dibutyltin dilaurate, dibutyltin maleate, dibutyltin diacetate, tin octylate, tin naphthenate, reaction products of dibutyltin oxide and phthalic acid esters, dialkyltin diacetyl acetonates such as, dibutyltin bis(acetylacetonate) (also commonly referred to as dibutyltinacetyl acetonate); dialkyltinoxides, such as dibutyltinoxide; organoaluminum compounds, such as aluminum trisacetylacetonate, aluminum trisethylacetonate, diisopropoxyaluminum ethylacetonate, etc.; reaction products, such as bismuth salts and organic carboxylic acids, such as bismuth tris(2-ethylhexoate), bismuth tris(neodecanoate), etc.; chelate compounds, such as zirconium tetracetylacetonate, titanium tetraacetylacetonate, etc.; organo lead compounds, such as lead octylate; organovanadium compounds; amine compounds, such as butylamine, octylamine, dibutylamine, monoethanolamine, diethanolamine, triethanolamine, diethylenetriamine, trietbylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,1-diazabicyclo(5,4,0)undecene-7 (DBU), etc., or their salts with carboxylic acid, etc.; low-molecular-weight polyamide resins obtained from excess polyamines and poly basic acids; reaction products of excess polyamines and epoxy compounds; etc. However, these compounds are not particularly limited; one can use any silanol condensation catalysts which are in general use. These silanol condensation catalysts may be used individually or in combinations of 2 or more. Among these silanol condensation catalysts, organometallic compounds or combinations of organometallic compounds and amine compounds are preferable from the point of view of curability. Especially desirable are organotin compounds, such as, dibutyltin maleate, dibutyltin diacetate, tin octylate, tin naphthenate, reaction products of dibutyltin oxide and phthalic acid esters, dibutyltin diacetylacetonate, dibutyltinoxide and the like.

In another embodiment, the active agent may be a curing accelerator for an epoxy resin composition. Such accelerator is preferably a urea or an imidazole. Preferred ureas include, 3-phenyl-1,1-dimethylurea; 3-(4-chlorophenyl)-1,1-dimethylurea; 3-(3,4-dichlorophenyl)-1,1-dimethylurea; 1,1'-(4-methyl-m-phenylene)bis(3,3'-dimethylurea); 3-isomethyldimethylurea-3,5,5-trimethylcyclohexyldim-ethylurea; or 4,4'-methylenebis(phenyldimethylurea). The more preferred urea is 3-phenyl-1,1-dimethylurea (PDMU). Preferred imidazoles include alkyl- or arylimidazoles, such as 2-methylimidazole, 2-undecylimidazole, 2-heptadecylimidazole, 2-phenylimidazole, 2-ethylimidazole, 2-isopropylimidazole, and 2-phenyl-4-methylimidazole; 1-cyanoethyl derivatives, such as 1-cyanoethyl-2-methylimidazole, 1-cyanoethyl-2-phenylimidazole, 1-cyanoethyl-2-undecylimidazole, and 1-cyanoethyl-2-isopropylimidazole; and carboxylic salts, such as 1-cyanoethyl-2-ethyl-4-methylimidazole-trimellitate. Other catalysts for the curing of epoxy resin compositions which may be useful active agent in this invention include those disclosed in U.S. Pat. No. 5,344,856, relevant portions incorporated herein by reference.

In one embodiment the active agent is hydrosilylation catalyst as described in U.S. Pat. No. 5,567,833 at column 17 lines 31 to 57; U.S. Pat. No. 5,409, 995; U.S. Pat. No. 3,971,751; and U.S. Pat. No. 5,223,597 incorporated herein by reference. The most preferred hydrosilylation catalyst is chloroplatinic acid.

In another embodiment the active agent is a free radical catalyst or initiator. Free radical catalysts and initiators are well known in the art, examples are disclosed in U.S. Pat. No. 4,618,653; and U.S. Pat. No. 5,063,269, at column 6, lines 37 to 54, incorporated herein by reference. In yet another embodiment the active agent can be an amine or an imidazole which functions as a catalyst, curing agent or accelerator in a polymeric curing reaction. Included in the useful amines are primary, secondary and tertiary amines as described herein.

Preferably, the active agent is an organo metallic compound, more preferably the active agent is an organo tin compound. Even more preferably the active agent is a dialkyltin oxide; such as dibutyltin oxide; dialkyltin bisacetyl acetonate; or the reaction product of diakyltin oxide with a phthalic ester or pentanedione.

The amount of encapsulated active agent needed depends upon the nature of the active agent and the polymer used in formulation and the loading level of the active agent in the encapsulated active agent. In a preferred embodiment, such as where the polymer has silicon moieties with hydrolyzable moieties bound thereto, the amount of active agent in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less and about 0.4 percent by weight or less.

In the embodiment wherein the active agent is an organic based catalyst, accelerator or curing agent, care must be taken to make sure that the active agent and encapsulating agent are chosen such that the active agent can be encapsulated within the encapsulating agent at a temperature at which the active agent does not volatilize. The use of an encapsulating agent that the active agent is soluble in reduces the volatility of the active agent and enhances the formation of the desired particles. Active agents exhibit enhanced solubility in encapsulating agents having a polar nature, such as, for example, polyester, polyamides, and side chain crystalline polymers. Does not volatilize means that under the conditions of encapsulated active agent particle formation, the formed particle does not exhibit substantial extraction of active agent at ambient conditions during the first extraction after particle formation. Preferably, the active agent has a low partial pressure under particle formation conditions.

In the embodiment wherein the polymer is a polyurethane prepolymer having free isocyanates, the active agent may be a compound containing more than one active hydrogen atom. Such active hydrogen atom containing materials are disclosed in Bhat, U.S. Pat. No. 5,672,652 relevant parts incorporated herein by reference. In that embodiment where the polyurethane prepolymer contains active hydrogen containing functionality, a poly isocyanate as described in Bhat U.S. Pat. No. 5,672,652 may be encapsulated in the encapsulating agent. Where the prepolymer is a polyurethane prepolymer having isocyanate functionality, the active agent can include a known chain extender for polyurethanes. Such chain extenders are well known to those skilled in the art.

In that embodiment where the reactive functionality of the polymer is an epoxy functionality, a curing agent for the epoxy functionality may be encapsulated in the encapsulating agent. The curing agent can be any known curing agent useful with epoxy resins. Such curing agents are well known to one skilled in the art. Representative curing agents are disclosed in U.S. Pat. No. 5,308,895 at column 11, line 8 to column 12 line 47 incorporated herein by reference. More preferably the curing agent is an amine terminated polyether such as the Jeffamines™ available from Huntsman Chemical, anhydrides, and cyandiamides or dicyandiamides and derivatives thereof. The most preferred curing agents are the dicyandiamides and the derivatives thereof. Where the active agent is a curing agent for an epoxy resin, the active agent is used in an amount such that the ratio epoxy groups in the formulation to moieties of the curative used reactive with epoxy groups is from about 0.7 to 1 to about 1.3 to 1. The curing agent may be present in an amount of from about 0.5 to about 7 percent by weight based on the amount of the total formulation. It is preferable that there be a slight excess of epoxy such that the range is about 1.05 to 1 to 1.1 to 1.

In the embodiment wherein the reactive group is a reactive silicone, or a hydrolyzable silicon moiety, the adhesive composition may further comprise an encapsulated curing agent for the siloxy moiety. Such compound can be a hydrolyzable silicone compound, such compounds are disclosed in U.S. Pat. No. 5,541,266 incorporated herein by reference. Hydrolyzable silicon compounds useful include those represented by formula 7:

(7)

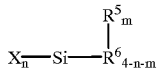

X represents a hydrolyzable group. $R^5$ represents a monovalent hydrocarbon group, and is preferably a lower alkyl group. $R^6$ represents a monovalent organic group containing an amino group or an imino group and having a ratio of carbon atom number to nitrogen atom number (C/N ratio) of more than 3. The C/N ratio is preferably 4 or more 3; m represents 0, 1 or 2 and preferably 0 or 1; n represents 1, 2 or 3; and (m+n) is less than 4; and preferably (m+n) is 3[.] and n is preferably 2 or 3. The molecular weight of the hydrolyzable silicon compound is preferably 1000 or less. $R^6$ includes $R^7$ N($R^8$)—$R^9$—N($R^{10}$)—$R^{11}$ wherein $R^7$ and $R^8$ each represents a divalent hydrocarbon group containing 2 or more carbon atoms, and at least one of $R^7$ and $R^9$ contains 4 or more carbon atoms. $R^8$, $R^{10}$, and $R^{11}$ each represents a hydrogen atom or a monovalent hydrocarbon group, preferably an alkyl group containing 1 to 3 carbon atoms.

The specific but non-limiting examples of the above mentioned hydrolyzable silicon compound are shown below $H_2N(CH_2)_6NH(CH_2)_3Si(OCH_3)_3$,
$H_2N(CH_2)_8NH(CH_2)_3Si(OCH_3)_3$,
$H_2N(CH_2)_6NH(CH_2)_3Si(CH_3)(OCH_3)_2$,
$H_2N(CH_2)_6NH(CH_2)_3Si(OCH_2CH_3)_3$,
$H_2N(CH_2)_2NHCH_2$-ph-$(CH_2)_2Si(OCH_3)_3$, and
$H_2N(CH_2)_4NHCH_2$-ph-$(CH_2)_2Si(OCH_3)_3$,
wherein ph represents a p-phenylene group.

The hydrolyzable silicon compound is used in an amount of from about 0.01 to about 20 parts by weight, and preferably from about 0.1 to about 10 parts by weight, per 100 parts by weight of the oxyalkylene polymer having a reactive silicon group and capable of cross-linking on siloxane bond formation. If the amount exceeds about 20 parts by weight, the rubber physical properties after curing are adversely affected.

Further examples of such hydrolyzable silicone compounds capable of cross-linking the silicone reactive polymer are disclosed in U.S. Pat. No. 5,541,266 incorporated herein by reference. Other such potential additives include organic silicone compounds B as disclosed in U.S. Pat. No. 4,837,274. See columns 7, line 12 to column 9, line 15 incorporated herein by reference.

The encapsulating agent is a crystallizable or thermoplastic polymer which can melt between about 40° C. and about 250° C. Transition point as used herein refers to the point at which the thermoplastic or crystallizable polymer undergoes a change, which results in the release of the active agent. One transition point is where the thermoplastic or crystallizable polymer melts and releases the active agent. Another transition point is where the thermoplastic or crystallizable polymer changes sufficient to allow the active agent to permeate out of the particles. It is preferable that the thermoplastic or crystallizable polymeric moiety should cross over the transition point, for instance melt, over a relatively small temperature range so that release of the active agent can occur quickly. Preferably the thermoplastic or crystallizable polymer has a transition point at a temperature of about 40° C. or greater, more preferably about 50° C. or greater and most preferably about 60° C. or greater. Preferably such thermoplastic or crystallizable polymer has a transition point at about 250° C. or less more preferably about 200° C. or less and most preferably about 110° C. or less.

Preferably the crystalline polymer is a polyolefin, polyester, polyamide, phenoxy thermoplastic, polylactic acid; polyether; polyalkylene glycol or a side chain crystallizable polymer. More preferably the crystallizable polymer is polyethylene, polypropylene, polyethylene glycol, phenoxy thermoplastic, polylactic acid or a side chain crstyllizable polymer. Even more preferred crystallizable polymers are polyethylene, polyethylene glycol or a side chain crystallizable polymer, with side chain acrylate polymers being most preferred. Preferable thermoplastic polymers include styrenics, styrene acrylonitriles, low molecular weight chlorinated polyethylenes, soluble cellulosics, acrylics, such as those based on methyl methacrylate or cycloaliphatic acrylates.

The side chain crystallizable polymers can be derived from a single polymer or from a mixture of polymers, and the polymer can be a homopolymer, or a copolymer of two or more comonomers, including random copolymers, graft copolymers, block copolymers and thermoplastic elastomers. Preferably at least part of the crystallizable polymer is derived from a side chain crystallizable (SCC) polymer. The SCC polymer may, e.g., be derived from one or more acrylic, methacrylic, olefinic, epoxy, vinyl, ester-containing amide-containing or ether-containing monomers. The preferred SCC polymeric moieties are described in detail below. However, the invention includes other crystalline polymers having the desired properties. Such other polymers include, e.g., polymers in which the crystallinity results exclusively or predominantly from the polymer backbone, e.g., polymers of α-olefins containing 2 to 12, preferably 2 to 8, carbon atoms, e.g., polymers of monomers having the formula $CH_2$=CHR, where R is hydrogen, methyl, propyl, butyl, pentyl, 4-methylpentyl, hexyl or heptyl, as well as other polymers such as polyesters, polyamides, and polyalkylene oxides, e.g., polytetrahydrofuran. A crystallinity such that the DSC heat of fusion is at least 10 J/g, particularly at least 20 J/g, is preferred. The steric nature of the polymeric moiety can also be significant in determining the availability of the active moiety, especially when it is a stereospecific catalyst. It is important that the crystallizable polymeric moiety should melt over a relatively small temperature range so that release of the active agent can occur quickly.

SCC polymer moieties which can be used in this invention include moieties derived from known SCC polymers, e.g., polymers derived from one or more monomers such as substituted and unsubstituted acrylates, methacrylates, fluoroacrylates, vinyl esters, acrylamides, methacrylamides, maleimides, α-olefins, p-alkyl styrenes, alkylvinyl ethers, alkylethylene oxides, alkyl phosphazenes and amino acids; polyisocyanates; polyurethanes; polysilanes; polysiloxanes; and polyethers; all of such polymers contain long chain crystallizable groups. Suitable SCC polymers are described, e.g., in J. Poly. Sci. 60, 19 (1962), J. Poly. Sci. (Polymer Chemistry) 7, 3053 (1969), 9, 1835, 3349, 3351, 3367, 10, 1657, 3347, 18, 2197, 19, 1871, J. Poly. Sci. Polymer Physics Ed. 18, 2197 (1980), J. Poly. Sci. Macromol. Rev. 8, 117 (1974), Macromolecules 12, 94 (1979), 13, 12, 15, 18, 2141, 19, 611, JACS 75, 3326 (1953), 76; 6280, Polymer J. 17, 991 (1985); and Poly. Sci. USSR 21, 241 (1979).

The SCC polymer moieties which are preferably used in this invention can be broadly defined as moieties which comprise repeating units of the general formula:

where Y is an organic radical forming part of the polymer backbone and Cy comprises a crystallizable moiety. The crystallizable moiety may be connected to the polymer backbone directly or through a divalent organic or inorganic radical, e.g., an ester, carbonyl, amide, hydrocarbon (e.g. phenylene), amino, or ether link, or through an ionic salt linkage (e.g. a carboxyalkyl ammonium, sulfonium or phosphonium ion pair). The radical Cy may be aliphatic or aromatic, e.g., alkyl of at least about 10 carbons, fluoralkyl of at least about 6 carbons or p-alkyl styrene wherein the alkyl group contains about 6 to about 24 carbons. The SCC moiety may contain two or more different repeating units of this general formula. The SCC may also contain other repeating units, but the amount of such other units is preferably such that the total weight of the crystallizable groups is at least equal to, e.g., twice, the weight of the remainder of the block.

Preferred SCC moieties comprise side chains containing in total at least times as many carbon atoms as the backbone of the moiety, particularly side chains comprising linear polymethylene moieties containing about 12 to about 50, especially about 14 to about 22 carbon atoms, or linear perfluorinated or substantially perfluorinated polymethylene moieties containing about 6 to about 50 carbon atoms. Polymers containing such side chains can be prepared by polymerizing one or more corresponding linear aliphatic acrylates or methacrylates, or equivalent monomers such as acrylamides or methacrylamides. A number of such monomers are available commercially, either as individual monomers or as mixtures of identified monomers, e.g., C12A, C14A, C16A, C18A, C22A, a mixture of C18A, C20A and C22A, a mixture of C26A to C40A, fluorinated C8A (AE800 from American Hoechst) and a mixture of fluorinated C8A, C10A and C12A (AE12 from American Hoechst). The polymers can optionally also contain units derived from one or more other comonomers preferably selected from other alkyl, hydroxyalkyl and alkoxyalkyl acrylates, methacrylates (e.g. glycidal methacrylates); acrylamides and methacrylamides, acrylic and methacrylic acids; acrylamide; methacrylamide; maleic anhydride; and comonomers containing amide groups. Such other co-monomers are generally present in total amount less than about 50 percent particularly less than about 35 percent especially less than about 25 percent, e.g., about 0 to about 15 percent. They may be added to modify the transition point or other physical properties of the polymers. The transition point of a polymer containing such polymethylene side chains is influenced by the number of carbon atoms in the crystallizable side chains. For example, homopolymers of C14A, C16A, C18A, C20A, C22A, C30A, C40A and C50A respectively typically have melting points of 20, 36, 49, 60, 71, 76, 96 and 102° C., while the homopolymers of the corresponding n-alkyl methacrylates typically have melting points of 10, 26, 39, 50, 62, 68, 91 and 95° C. Copolymers of such monomers generally have intermediate melting points. Copolymers with other monomers, e.g., acrylic acid or butyl acrylate, typically have somewhat lower melting points.

Other polymers which can provide SCC moieties for use in this invention include atactic and isotactic polymers of n-alkyl α-olefins (e.g. the atactic and isotactic polymers of $C_{16}$ olefin, having $T_m$'s of 30° and 60° C. respectively); polymers of n-alkylglycidyl ethers (e.g. the polymer of $C_{18}$ alkyl glycidylether); polymers of n-alkyl vinyl ethers (e.g. the polymer of $C_{18}$ alkylvinylether having a $T_m$ of 55° C.; polymers of n-alkyl-α-epoxide having a $T_m$ of 60° C.); polymers of n-alkyl oxycarbonylamido-ethylmethacrylates (e.g. the polymers of $C_{18}$ IEMA, $C_{22}$ IEMA and $C_{30}$ IEMA having $T_m$'s of 56°, 75° and 79° C. respectively); polymers of n-fluoro alkyl acrylates (e.g. the polymers of $C_8$ hexadecafluoroalkylacrylate, and of a mixture of $C_{8-12}$ alkyl fluoroacrylates having $T_m$'s of 74° C. and 88° C. respectively); polymers of n-alkyloxazolines (e.g. the polymer of $C_{16}$ alkyl oxazoline having a $T_m$ of 155° C.); polymers obtained by reacting an hydroxyalkyl acrylate or methacrylate with an alkyl isocyanate (e.g. the polymers obtained by reacting hydroxyethyl acrylate with $C_{18}$ or $C_{22}$ alkyl isocyanate and having $T_m$'s of 78° and 85° C. respectively); and polymers obtained by reacting a difunctional isocyanate, a hydroxyalkyl acrylate or methacrylate, and a primary fatty, alcohol (e.g. the polymers obtained by reacting hexamethylene diisocyanate, 2-hydroxyethyl acrylate, and $C_{18}$ or $C_{22}$ alcohols, and having $T_m$'s of 103° and 106° C. respectively).

Preferred SCC polymer moieties used in this invention comprise about to about 100 percent preferably about 40 to about 100 percent, of units derived from at least one monomer selected from the group consisting of alkyl acrylates, alkyl methacrylates, N-alkyl acrylamides, N-alkyl methacrylamides, alkyl oxazolines, alkyl vinyl ethers, alkyl vinyl esters, α-olefins, alkyl 1,2-epoxides and alkyl glycidyl ethers in which the alkyl groups are n-alkyl groups containing about 12 to about 50 carbon atoms, and the corresponding fluoroalkyl monomers in which the thermoalkyl groups are n-fluoroalkyl groups containing about 6 to about 50 carbon atoms; about 0 to about percent of units derived from at least one monomer selected from the group consisting of alkyl acrylates, alkyl methacrylates, N-alkyl acrylamides, alkyl vinyl ethers, and alkyl vinyl esters in which the alkyl groups are n-alkyl groups containing about 4 to about 12 carbon atoms; and about 0 to about 15 percent of units derived from at least one polar monomer selected from the group consisting of acrylic acid, methacrylic acid, itaconic acid, acrylamide, methacrylamide, acrylonitrile, methacrylonitrile, vinyl acetate and N-vinyl pyrrolidone. Such SCC moieties may also contain units derived from other monomers to change compatibility with the matrix, or to raise the modulus of a reaction product containing the modifying agent; such monomers include styrene, vinyl acetate, mono acrylic functional polystyrene and the like. Preferably the side chain crystalline polymers used do not contain a significant amount of functional groups, such as those having active hydrogen atoms, as the presence of a significant amount of active hydrogen atoms increases the viscosity of the polymers and this can negatively impact the process used to prepare the encapsulated active agent particles.

The number average molecular weight of the SCC polymer moiety is preferably less than about 200,000, more preferably less than about 100,000, particularly less than about 50,000, more particularly about 1,000 to about 20,000. The molecular weight of the SCC polymer moiety can be adjusted (e.g. through choice of the reaction conditions and addition of chain transfer agents) so as to optimize the reactivity of attached moieties without substantial change in Tm.

The encapsulated active agent may be prepared by the following procedures: a) dispersing or dissolving the active agent in the encapsulating material at a temperature sufficient to melt the encapsulating material and not so high that the active agent volatilizes; b) forming droplets of active agent interspersed with the encapsulating material and c) cooling the droplets to solidify the encapsulated agent. Optionally, the process may further comprise d) contacting the droplets with a solvent that dissolves the active agent but does not dissolve the encapsulating material, so as to remove active agent from the surface of the encapsulating material. It is preferable to avoid this last step. This process is described in U.S. Pat. No. 5,601,761 incorporated herein by reference. More particularly the encapsulating agent is heated until it is in the liquid state, i.e., molten. Thereafter, the active agent is dispersed in the encapsulating agent. Preferably the active agent is not volatile under the conditions at which the encapsulating agent is molten. The mixture is formed into particles, preferably of about 3000 microns or less. Any means for taking a liquid composition or dispersion and forming it into particles or droplets of the desired size may be used, for instance atomization of the particles by any means or by dropping the particles on a rotating disk. Thereafter the particles are exposed to conditions wherein the surfaces of the particles rapidly solidify. Rapidly solidify means that the active agent in particles formed are not substantially extractable from the particle formed at ambient conditions in a first extraction after particle formation. Further evidence of rapid solidification is the formation of a shell about the particle wherein the encapsulating agent has a different crystal structure than the interior portion of the particle. Generally, rapid solidification means the particles solidify at the surface in a matter of seconds, preferably about 10 seconds or less and more preferably about 5 seconds or less. It is believed that exposing the particles to rapid quenching results in the desired structure and properties of the particles. Any means of allowing the particles to rapidly solidify at the surface may be used. Passing the particles through a zone of air or an inert gas at ambient temperatures or a cooled zone is one method of rapidly solidifying the surface of the particles. Any process which disperses particles of the molten formulation it on a cooling zone, such as an air zone, may be used.

In performing this process the temperature of the process is selected such that the encapsulating agent is in a molten or liquid form and has a suitable viscosity for the processing technique used, such as rotating disk. Further the temperature and other process conditions should be chosen that the active agent is not volatile. Generally not volatile as used herein means the active agent has a low partial pressure. In general preferred temperatures at which the active agent is contacted with the encapsulating material is about 40° C. or greater, more preferably about 100° C. or greater, most preferably about 120° C. or greater and preferably about 250° C. or less, more preferably about 200° C. or less and most preferably about 180° C. or less. In order to successfully prepare the desired particles, it is preferable that the mixture prepared have a viscosity which is suitable for use with the process of forming the particles, such as a rotating disk process. Preferably the viscosity is about 500 centipoise or less, more preferably about 100 centipoise or less and most preferably about 50 centipoise or less. In order to achieve the desired viscosity, it may be useful to add a solvent or platicizer to the mixture. In a preferred embodiment of this process the active agent dissolves in the molten polymer. It is believed that this provides for better dispersion and distribution. The active agent is preferably mixed with a encapsulating agent in the molten state at a temperature at which the active agent or a mixture thereof is not volatile. Under these circumstances, the particle prepared will not exhibit significant extraction of the active agent at ambient temperatures. This results in a very stable encapsulated catalyst and a very stable adhesive formulation prepared from such catalyst. Preferably the temperature of the disk upon which the molten mixture is poured is about 75° C. or greater, more preferably about 100° C. or greater and most preferably about 125° C. or greater and is preferably about 250° C. or less, more preferably about 200° C. or less and most preferably about 180° C. or less. Preferably the disk is rotating at about 500 rpm or greater, more preferably about 1,000 rpm or greater and most preferably about 5,000 rpm or greater. The upper limit on the revolutions per minute used for the rotating disk is based on practicality. The encapsulated active agent particles formed demonstrate a shell portion at and near the surface of the particle and an inner portion surrounded by the shell. The shell portion has a different crystal structure than the crystal structure of the inner portion of the particle. In the inner portion, the active agent is dispersed in the encapsulating agent. There is no significant amount of active agent in the shell at and near the surface of the particle. This means that the active agent cannot be extracted as described herein. In preferred embodiments, the active agent is not present in the shell layer in any significantly measurable amount. It is believed that this shell layer at and near the surface prevents the extraction of the active agent by solvent. The presence of this layer is indicated by the active agent not being extractable in a significant amount when the particles are contacted with a solvent for the active agent. The ability of the particle to resist extraction of the active agent using a solvent is an indication that the encapsulated active agent will be stable in a formulation at ambient temperatures, meaning significant amounts of the active agent will not come into contact with the curable composition and initiate cure at ambient temperatures. Preferably the active agent is not substantially extractable from the encapsulated active agent beads. By not substantially extractable is meant that there is no need to wash the surface of the particle with a solvent to make the particle stable in an adhesive formulation. Preferably not significantly extractable means 10 percent or less based on the amount of active agent in the particle is extracted by a solvent or plasticizer when the particles are contacted with the solvent or plasticizer for the active agent, more preferably 5 percent or less, even more preferably 1 percent or less, even more preferably 0.5 percent by weight or less and most preferably about 0.1 percent by weight or less, of the active agent contained in the particle. In some embodiments the amount of catalyst extracted is below the detection limits of the analytical techniques used to measure for the active agent as demonstrated in Example 7 herein. Preferably the particles have a particle size of about 3000 microns or less, more preferably about 300 microns or less and most preferably about 150 microns or less. Preferably the particles demonstrate a narrow particle size distribution. Narrow particle size distribution means herein that there are not a significant amount of particles with a size greater than 5 times the median particle size of the particles and more preferably 2 times. Particle size as used herein can be measured by laser scattering particle size analysis as disclosed in Example 7.

In one embodiment active agents can be encapsulated in a side chain crystallizable polymer as described hereinbefore. In another embodiment the side chain crystallizable polymers are heated above their melting point to a molten state and the active agent is dissolved in the side chain crystallizable polymer. The mixture is then cooled resulting in the polymer crystallizing and causing phase separation of the catalyst rich regions to form microparticulates. This mass is then mechanically ground. In some embodiments, the adhesive formulations made using these encapsulated active agents are not stable without further processing of the particles. In some embodiments it is necessary to wash the particles with a solvent for the active agent to remove them from the surface area of the particles. This process may be performed as described in Hoffman et al., U.S. Pat. No. 5,601,761.

The concentration of active agent in the particles is preferably about 1 weight percent, or greater, more preferably about 20 weight percent or greater and most preferably about 25 weight percent or greater. The concentration of active agent in the particles is preferably about 70 weight percent or less, more preferably about 65 weight percent or less, even more preferably about 50 weight percent or less, and most preferably about 45 weight percent or less based on the total weight of active agent and encapsulating agent.

The adhesive formulation of the invention contains a sufficient amount of encapsulated active agent particles to effectuate curing of the adhesive composition when exposed to the necessary conditions for curing. The amount of encapsulated active agent needed depends upon the nature of the active agent, the polymer used in the formulation and the loading level of the active agent in the encapsulated active agent. One skilled in the art can generally determine this. In a preferred embodiment the adhesive composition preferably contains a sufficient amount of encapsulated active agent to provide the following amount of active agent (amount of active agent exclusive of encapsulating agent). Preferably the amount of active agent is about 0.01 percent by weight or greater based on the adhesive composition, more preferably about 0.1 percent by weight or greater and most preferably about 0.2 percent by weight or greater. The adhesive formulation of the invention preferably contain about 5 percent by weight or less of encapsulated active agent particles, more preferably about 1.0 percent by weight or less of the active agent and most preferably 0.4 percent by weight or less of the active agent.

The adhesive formulation may contain other additives commonly used in adhesives formulations as known to those skilled in the art. The adhesive of the invention may be formulated with fillers known in the prior art for use in adhesive compositions. By the addition of such materials, physical properties such as viscosity, flow rates, sag and the like can be modified. However, to prevent premature hydrolysis of any moisture sensitive groups, it is preferable to thoroughly dry the fillers should be thoroughly dried before admixture with other adhesive components. In the embodiment where the polymer contains room temperature vulcanizable moieties (reactive siloxane or silane moieties) it is not necessary to thoroughly dry the fillers for stability of the adhesive formulation.

Optional components of the adhesive of the invention include reinforcing fillers. Such fillers are well-known to those skilled in the art and include carbon black, titanium dioxide, calcium carbonate, surface treated silicas, titanium oxide, fumed silica, and talc. Preferred reinforcing fillers comprise carbon black. In one embodiment, more than one reinforcing filler may be used, of which one is carbon black, and a sufficient amount of carbon black is used to provide the desired black color to the adhesive. Preferably the only reinforcing filler used is carbon block. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 15 parts by weight or greater and most preferably about 17 parts by weight or greater. Preferably the reinforcing filler is present in an amount of about 40 parts by weight of the adhesive composition or less, more preferably about 25 parts by weight or less and most preferably about 23 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray dried beads or finely ground particles. Clays may be used in an amount of about 0 parts by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of this invention may further comprise plasticizers so as to modify the Theological properties to a desired consistency. Such materials are preferably free of water, inert to reactive groups and compatible with the polymer used in the adhesive. Suitable plasticizers are well known in the art and preferable plasticizers include alkyl phthalates such as dialkyl phthalate wherein the alkyl phthalate is linear with mixed $C_7$, $C_9$ and $C_{11}$ alkyl groups, diisononyl phthalate diisododecyl phthalate, dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene, xylene, nmethylpyrolidinone and alkyl naphthalenes. The preferred plasticizers are the phthalates. The more preferred plasticizers are dialkyl phthalate wherein the alkyl group is mixed linear $C_7$, $C_9$ and $C_{11}$, diisononyl phthalate or diisododecyl phthalate. The amount of plasticizer in the adhesive composition is that amount which gives the desired rheological properties and which is sufficient to disperse the active agent in the system. The amounts disclosed herein include those amounts added during preparation of the prepolymer and during compounding of the adhesive. Preferably plasticizers are used in the adhesive composition in an amount of about 0 parts by weight or greater based on the weight of the adhesive composition, more preferably about 5 parts by weight or greater and most preferably about 10 parts by weight or greater. The plasticizer is preferably used in an amount of about 45 parts by weight or less based on the total amount of the adhesive composition and more preferably about 40 parts by weight or less.

The adhesive of this invention may further comprise stabilizers which function to protect the adhesive composition from moisture, thereby inhibiting advancement and preventing premature cross-linking of the of the polymer capable of cross-linking in the adhesive formulation. Included among such stabilizers are diethylmalonate and alkylphenol alkylates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

Optionally, the adhesive composition may further comprise a thixotrope. Such thixotropes are well-known to those skilled in the art and include alumina, limestone, talc, zinc oxides, sulfur oxides, calcium carbonate, perlite, slate flour, salt (NaCl), and cyclodextrin. The thixotrope may be added to the adhesive of the composition in a sufficient amount to give the desired Theological properties. Preferably the thixotrope is present in an amount of about 0 parts by weight or greater based on the weight of the adhesive composition, preferably about 1 part by weight or greater. Preferably the optional thixotrope is present in an amount of about 10 parts by weight or less based on the weight of the adhesive composition and more preferably about 2 parts by weight or less.

In some embodiments it is desirable to add an adhesion promoter to the composition. An adhesion promoter can be added to enhance adhesion to either the glass or to the surface of the substrate to which the glass is bonded to such as metal, primed metal or coated metal. Adhesion promoters known to those skilled in the art may be used. Among preferred adhesion promoters for adhesion to coated surfaces, such as those coated with Gen IV paints, commonly used in the automotive industry, are the amino alkoxy silanes, vinyl alkoxy silanes, isocyanto alkoxy silanes and isocyanurate functional alkoxy silanes. More preferred adhesion promoter include gamma-glycidoxypropyltrimethoxy silane, gamma-aminopropyltrimethoxy silane, gamma-isocyanatopropyltrimethoxy silane, n-beta-(aminoethyl)-gamma-aminopropyltrimethoxy silane, n-(2-aminoethyl)-3-aminopropylmethyldimetoxy silane, 3-aminopropylmethyldimetoxy silane, bis-(gamma-trimethoxysilylpropylamine), n-phenyl-gamma-aminopropyltrimethoxysilane, gamma-isocyanatopropylmethyldimethoxy silane, gamma-isocyanatopropyltriethoxy silane, beta (3,4-epoxycyclohexyl)ethyltriethoxysilane, gamma-glycidoxypropylmethyldimethoxy silane, tris(gamma-trimethoxysilylpropyl)isocyanurate, vinyltriethoxysilane, or vinyltrimethoxysilane. The silane may be blended with the polymer. In another embodiment the adhesion promoter is a silane which has an active hydrogen atom which is reactive with the reactive moiety of the polymer. Preferably such silane is a mercapto-silane or an amino-silane and more preferably is a mercapto-trialkoxy-silane or an amino-trialkoxy silane. In one embodiment, the silane having, an active hydrogen atom reactive with isocyanate moieties, can be reacted with the terminal isocyanate moieties of a polyurethane prepolymer. Such reaction products are disclosed in U.S. Pat. No. 4,374,237 and U.S. Pat. No. 4,345,053 relevant parts incorporated herein by reference In yet another embodiment, the silane having a reactive hydrogen moiety reactive with an isocyanate moiety can be reacted into the backbone of a polyurethane prepolymer by reacting such silane with the starting materials during the preparation of the polyurethane prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the polymer, reacted with a polyurethane prepolymer or reacted with a polyisocyanate and a compound having on average more than one moiety reactive with an isocyanate moiety. Such adducts are disclosed in U.S. Pat. No. 5,623,044 relevant parts incorporated herein by reference. Such adhesion promoters are present in sufficient amount to promote the adhesion of the adhesive to the glass or other substrate surface to the desired level usually determined by testing the lap shear strength and failure mode of the bond to the substrate. Preferably the amount of adhesion promoter is about 10 parts by weight or less based on the weight of the adhesive; more preferably 5 parts by weight or less and most preferably about 21 parts by weight or less. Preferably the amount of adhesion promoter is about 0.01 parts by weight or greater based on the weight of the adhesive; more preferably 0.1 parts by weight or greater and most preferably about 0.5 parts by weight or greater.

In another embodiment the adhesion promoter may be encapsulated in an encapsulating agent as described herein. In this embodiment the adhesion promoter can be used in the same manner as active agents. Encapsulation of adhesion promoters can enhance the stability of some adhesive compositions.

The adhesive composition can also contain heat stabilizers known in the art. Among preferred heat stabilizers are alkyl substituted phenols, phosphites, sebacates, and cinnamates. Among more preferred heat stabilizers are bis(1, 2,2,6,6,-pentamethy-4-piperidinyl) sebacate, Irgafox-168, ethylene bis(oxyethylene) bis(3-tert-butyl-4-hydroxy-5 (methylhydrocinnamate), tetrakis isodecyl 4,4' isopropylidene diphosphite, and butylated hydroxytoluene The preferred class of heat stabilizers are the sebacates such as bis(1,2,2,6,6,-pentamethy-4-piperidinyl) sebacate. Preferably the amount of heat stabilizer is about 5 parts by weight or less based on the weight of the adhesive; more preferably 2 parts by weight or less and most preferably about 1.0 part by weight or less. Preferably the amount of adhesion promoter is about 0.01 parts by weight or greater based on the weight of the adhesive; more preferably 0.5 parts by weight or greater and most preferably about 0.5 parts by weight or greater.

Other components commonly used in adhesive compositions may be used in the adhesive composition of this invention. Such materials are well-known to those skilled in the art and may include ultraviolet stabilizers and antioxidants.

As used herein, all parts by weight relative to the components of the adhesive composition are based on 100 total parts by weight of the adhesive composition and all percentages by weight are based on the weight of the adhesive composition.

The adhesive composition of this invention may be formulated by blending the components together using means well-known in the art. Generally the components are blended in a suitable mixer. Such blending is preferably conducted in an inert atmosphere in the absence of oxygen and atmospheric moisture to prevent premature reaction. It may be advantageous to add any plasticizers to the reaction mixture for preparing the polymer such as an isocyanate containing prepolymer so that such mixture may be easily mixed and handled. Alternatively, the plasticizers can be added during blending of all the components.

The encapsulated active agent particles can be blended or mixed into the adhesive formulation using different processes at different stages of production. The encapsulated active agent particles can be blended into the prepolymer after it has been synthesized. This prepolymer, with the blended encapsulated active agent particles, is then used for compounding into the adhesive. The encapsulated active agent particles can also be blended into the adhesive directly after the compounding stage. Once the mixing and wetting cycle of the fillers is complete within the mixing or blending apparatus, the encapsulated active agent particles are added so as to achieve a good dispersion. The encapsulated active agent particles can be coextruded either dry or in a slurry with the prepolymer directly into the package during the filling and packaging stage.

The encapsulated active agent can be blended with the adhesive application just prior to application of the adhesive composition to the substrate. This can be achieved by feeding two streams to the extrusion apparatus which applies the adhesive composition. Any suitable apparatus which can take two or more feed streams, mix them thoroughly and apply them to a substrate may be used. The ratio of based adhesive composition to encapsulated active agent should be chosen to allow for appropriate cure after activation. Preferably the encapsulated active agents are blended with fillers, and/or plasticizers to facilitate easy mixing of the streams.

The adhesive composition of the invention is used to bond porous and nonporous substrates together. The adhesive composition is applied to a substrate and the adhesive on the first substrate is thereafter contacted with a second substrate after activation of the adhesive. In preferred embodiments, the surfaces to which the adhesive is applied are cleaned and primed prior to application, see for example U.S. Pat. Nos. 4,525,511, 3,707,521 and 3,779,794 incorporated herein by reference. Some of the adhesives of the invention are applied at ambient temperature in the presence of atmospheric moisture. Exposure to atmospheric moisture is sufficient to result in curing of these adhesives. Curing is accelerated by the addition of the encapsulated active agent particles. Curing may be further accelerated by applying heat to the adhesive composition by means of convection heat, or microwave heating. Preferably the adhesive of the invention is formulated to provide a working time of about 6 minutes or greater more preferably about 10 minutes or greater. Preferably the working time is about 15 minutes or less and more preferably about 12 minutes or less. Working time is the time between activation of the adhesive composition and the time when the adhesive cures too much to adhere to the second substrate.

During the application of the adhesive of the invention, the particles are exposed to conditions to release the active agent so that it may accelerate the cure of the adhesive. This release of the active agent of the particles may be performed by the application of heat, shear forces, ultrasonic waves or microwaves during application of the adhesive. In many embodiments the dispensing apparatus has incorporated the necessary apparatus to release to active agent the particles. The dispensing apparatus can incorporate a heating element, a means of shearing the particles, or applying ultrasonic or microwaves. In one embodiment the adhesive composition is forced through a screen which is at its smallest point smaller than the smallest particles. In this embodiment it is preferable if the screen has long slits which have larger openings facing the adhesive to be extruded and smaller openings facing the dispensing nozzle wherein the smallest opening is smaller than the smallest particles and the larger opening is larger than the largest particle. This design reduces the pressure drop which results from driving the adhesive containing the particles through the screen.

The adhesive composition is preferably used to bond glass to other substrates such as composite metals, fiberglass or plastics. In a preferred embodiment the first substrate is a glass window and the second substrate is a window frame. In another preferred embodiment the first substrate is a glass window and the second substrate is a window frame of an automobile.

Preferably the cured adhesive compositions of the invention demonstrate an elongation of about 200 percent or greater as determined according to ASTM D-638-91, more preferably about 300 percent or greater and preferably greater than about 600 percent. Preferably the elongation is about 700 percent or less.

Viscosities as described herein are determined according to the procedure disclosed in Bhat, U.S. Pat. No. 5,852,104 at column 11, lines 34 to 44.

Molecular weights as described herein weight average molecular weights and are determined according to the procedure disclosed in Bhat U.S. Pat. No. 5,852,103 at column 11, lines 44 to 56.

In reference to polyurethane prepolymers, average isocyanate functionality is determined according to the procedure and formula disclosed in WO 96/21688 published Jul. 18, 1996 at page 13 lines 3 to 17 incorporated herein by reference.

In a preferred embodiment of the invention the adhesive composition of the invention is placed on a sheet of glass to be bonded into a substrate such as a building or an automobile. The adhesive is preferably deposited as a bead on the portion of the glass to be bonded into the substrate. The bead can be deposited by any known method to those skilled in the art. In one embodiment the bead can be deposited using a caulking gun or similar type of manual application device. In another embodiment the bead may be deposited by an extrusion apparatus such as a robotic extrusion apparatus. In the embodiment where the glass is window glass designed for use in automobiles, the bead is applied to the portion of the glass to be contacted with the flange of the automobile window. In a preferred embodiment the adhesive is applied to the glass in a location remote from the location where it is assembled into an automobile. Typically such remote location is a plant designed for assembling the window and adhesive.

Just before placing the window into the substrate, the adhesive composition is exposed to conditions such that the encapsulating active agent is released, such conditions include causing the encapsulating agent to melt, shear or changing the structure of the encapsulating agent so the active agent is capable of permeating out of the encapsulating agent to thereby initiate the curing reaction. Any phenomenon which results in the release of the active agent from the encapsulating agent can be used. Such phenomena such as shear forces, ultrasonic waves or application of heat by a variety of means can be used. Preferably the active agent is released by application of heat. Preferably the heat is applied by using convection heat, infrared heat sources, magnetic or electro magnetic heat sources, microwave heat sources and the like. In a more preferred embodiment the heat is applied using infrared heat sources. Preferably, the adhesive bead is heated from two sides, the first side is the portion of the bead not in contact with the glass and the other side is the portion of the bead in contact with the glass which is heated by application of infrared heat through the glass. The adhesive is preferably heated to a temperature of about 40° C. or greater, preferably about 50° C. or greater, even more preferably about 70° C. or greater, and most preferably about 85° C. or greater and preferably about 250° C. or less, more preferably about 200° C. or less, even more preferably about 110° C. or less and most preferably about 95° C. or less. It is preferable that the time period over which the activation takes place is as short as possible. This is to reduce the amount of heating equipment and floor space necessary for activating the adhesive. This is particularly important in an automobile assembly plant. Preferably the time period necessary for activation is less than about 10 minutes, more preferably less than about 5 minutes, more preferably less than about 3 minutes and most preferably less than about 2 minutes. In most practical applications heating time required will be greater than about 30 seconds. The heating temperature should be selected so as not to cause the polymer in the adhesive composition to degrade thereby comprising the properties of the finally cured system. After activation, the window can then be placed into the structure with the activated adhesive contacting both the window and the structure to which the window is to be bonded into. This contacting is performed by means well known to those skilled in the art. In particular, the glass can be placed in the structure by hand, by the use of a robot and the like. The adhesive of the this invention is stable for about 5 days when exposed to atmospheric conditions, in particular what is meant by stable for 5 days is that the adhesive remains curable and has not cured completely. Further, the adhesive of the invention demonstrates an ability to be activated by exposure to heat at between 40° C. to 250° C., preferably between 50° C. and 200° C. Further, the adhesive of the invention demonstrates a cure rate after six hours of 50 psi (3.45 mPa) or greater and more preferably 70 psi (4.83 mPa) or greater after six hours.

In one embodiment the invention is a window module having an uncured portion of the adhesive composition of the invention located on the window. The uncured adhesive is located on the portion of the window which will be contacted with the structure into which it will be bonded. In one preferred embodiment the adhesive is placed about the periphery of one face of the window. Typically the adhesive is in the form of a bead located about the periphery of the window. Preferably the bead is a profiled shape along the cross-sectional plane. The module is prepared by cleaning the surface to which the adhesive composition is to be applied. A solvent wipe can be used to do this. Generally a cloth or other device with an appropriate solvent is used to clean the surface. Thereafter a primer may be applied to the portion of the window to which the adhesive is to be applied. Glass primers and application methods for such primers are well known in the art. Typically the primer is applied with a brush or by a robot. A primer is not necessary where the adhesive is formulated so as to eliminate the need for one. Adhesives which contain a silane additive may not require the use of a primer. Thereafter the adhesive is applied to the window. This is done with the use of an extrusion apparatus, such as a caulking gun or a robot with an attached extrusion nozzle and adhesive delivery system. Such systems are well known in the art.

Some paints used commercially require high levels of adhesion promoter to facilitate bonding of the adhesive to the paint surface. In some cases such a high level of adhesion promoter may not be desirable in the entire adhesive bead. Thus, the adhesive bead can have two layers. In the level adjacent to the glass, either no adhesion promoter or low levels of adhesion promoter are used. The layer which will be bonded to the paint surface has a higher level of adhesion promoter. The two layers can be separately placed on the glass or can be coextruded onto the glass.

In a preferred embodiment, the optional primer and adhesive are applied in a location remote from the location where the window is bonded into the structure. "Remote from" means the adhesive is applied to the window at a location which is not adjacent to the place at which the window is to be assembled into the substrate, for instance in another part of the plant or another plant altogether. In the case of automobile windows, the location is remote from the automobile assembly plant. The window is thereafter transported to the automotive assembly plant. At the location where the window is to be bound into the structure, such as automotive assembly plant, the adhesive is activated as described in this application and placed into the structure to bond the window into the structure. The adhesive is preferably heated to a temperature at which the active agent is released and the curing of the adhesive is activated. Once the adhesive is activated the window is contacted with the structure, for instance a flange of an automobile window. The activated adhesive is located between the structure and the window and cures to bond the window into the structure.

Specific Embodiments

The following examples are provided to more fully illustrate the invention, and are not intended to limit the scope of the claim. Unless otherwise stated, all parts and percentages are by weight.

The following are tests used for the prepared sealants.

Lap Shear Test

A sealant approximately 6.3 mm wide by 8 mm high is applied along the width of the glass and approximately 6 mm to 12 mm from the primed end and expose he bead to IR heating to release the catalyst. The paint substrate is immediately placed on the sealant and the sample is allowed to cure at the condition of the 23° C. and 50 percent relative humidity for 5 days. The sample was then pulled at a rate of 1 inch/minute (2.5 cm/min)with an Instron Tester.

EXAMPLE 1

Preparation of a High Molecular Weight Polyether Diol

A mixture of 97.3 grams of polyglycol P1000, a 1000 MW polypropylene oxide diol from which essentially all of the catalyst (KOH) had been removed, and 9.73 g of 10 percent calcium, CEM ALL D10 (50 percent by weight calcium isooctoate in mineral spirits carrier, and which contains no glycol ether stabilizers, available from OMG Americas, Cleveland, Ohio) was placed in a dry, steam heated and stirred pressure reactor which was then purged with nitrogen several times. The mixture was heated to 100° C. and 1,985 grams of propylene oxide was added with rapid stirring. The product was a liquid having an equivalent weight of 5,218 determined by a wet method for hydroxyl analysis. The number average molecular weight of the product was 9,978 as determined by gel permeation chromatography using polyglycol standards and a polydispersity of 1.1 determined by size exclusion chromatography (gel permeation chromatography).

EXAMPLE 2

Preparation of a High Molecular Weight Isocyanate Prepolymer 300.35 grams of the polyglycol of Example 1 was mixed with 600 grams of toluene and stirred at 23° C. until well mixed. 8.2 milliliters of toluene diisocyanate were added and heated to 100° C. with stirring. After two hours the toluene was removed with vacuum. 308 g of a clear viscous light yellow liquid were recovered. The IR spectrum of the product showed that the isocyanate peak at 2274 $CM^{-1}$ was greatly reduced and the urethane peak at 1650 $CM^{-1}$ increased, indicating that most of the isocyanate had reacted. The NCO concentration of this mixture was 0.69 percent measured by a wet chemical method.

EXAMPLE 3

Preparation of a High Molecular Weight Urethane Elastomer 1.7 grams dibutyl tin dilaurate (Catachk 820 from Ferro Chemical Corp.) were added to 170 grams of the product of example 2. The mixture was mixed well. A 30 mil film was cast on glass plates and allowed to cure overnight at 23° C. The film demonstrated good adhesion to the glass plates. The elastomer was cured in a 70% relative humidity chamber for 4 days. The average physical properties of the elastomer (5 replicates) were 301 psi tensile strength, modulus 11.44 psi, 0.64 pounds load at tear and a 934% elongation at break.

EXAMPLE 4

Preparation of High Molecular Weight Silyl Terminated Polyether

In a dried, heated, nitrogen purged and mechanically stirred 500 milliliter round bottom flask were added 134.94 grams of the product of Example 1, 6.33 grams of Siliquest A1310, gamma-isocyanatopropyltriethoxysilane, and 1.52 grams dibutyl tin dilaureate. The mixture was heated to 100° C. with stirring and immediately allowed to cool to room temperature. A 30 mil film was drawn on glass plates. The film was allowed to moisture cure overnight. The film was tack free in about 24 hours. The film was placed in a 70 percent humidity chamber for 5 days and then placed in an oven at 50° C. overnight. The cured film had a 73 psi tensile strength, 35 psi modulus, and a 347 percent elongation at break.

EXAMPLE 5

A $C_{22}$ polyacrylate homopolymer (available from Landec Corporation Menlo Park, Calif.) (800 g) was heated to molten (m.p.>70° C.) and Neostann® U-220 dibutyltin bis(acetyl acetonate) (200 g) was added. The tin catalyst was soluble in the molten polymer and the solution was heated to 130° C. The solution of tin catalyst in polyacrylate was pumped at a rate of 132 g/min on to the surface of a rotating disk that had been heated to 125° C. and was rotating at a rate of about 15,000 rpm. The molten solution formed particles, which were spun into ambient air in a collection room over a period of about 7 to 8 minutes. The particles settled to the floor and were collected on "butcher" paper. The final product was a yellow powdery solid having particle sizes ranging from about 20–80 microns as observed under a light microscope.

EXAMPLE 6

In the same manner as described in Example 5, a copolymer of a $C_{22}$ acrylate monomer and 1 percent acrylic acid (available from Landec Polymers Menlo Park, Calif.) (800 g), was heated to molten (m.p.>70° C.) and Neostann® U-220 dibutyltin bis(acetyl acetonate) (200 g) was added. Again, the tin catalyst was soluble in the molten polymer and the solution was heated to 155° C. The solution of tin catalyst in polyacrylate was pumped at a rate of 132 g/min on to the surface of a rotating disk that had been heated to 159° C. The molten solution formed particles, which were spun into ambient air in a collection room over a period of about 7 minutes. The particles formed settled to the floor and were collected on butcher paper. The final product was is a beige powdery solid having particle sizes ranging from about 20 to 80 microns as observed under a light microscope.

The encapsulated tin catalysts were formulated into model silicone room temperature vulcanizable (RTV) formulations and evaluated for stability and reactivity.

Formulation 1.

| | |
|---|---|
| 5.0 g | Kaneka S-303H methoxysilyl-terminated polypropyleneoxide based polyether |
| 2.0 g | Palatinol 711P mixed linear alkyl phthalate plasticizer |
| 0.175 g | Encapsulated Neostann U-220 tin catalyst |

Comparison Formulation 1.

| | |
|---|---|
| 5.0 g | Kaneka S-303H methoxysilyl-terminated polypropyleneoxide based polyether |
| 2.0 g | Palatinol 711P mixed branched alkyl phthalate plasticizer |
| 0.035 g | Neostann U-220 tin catalyst (not encapsulated) |

At room temperature conditions, Formulation 1 had 16–17 days storage stability without gelation. However, Comparison Formulation 1 gels within hours. Upon heating Formulation 1 for 2.5 minutes on a hot plate set at 100° C., cure is triggered and gelation occurs within hours (overnight).

EXAMPLES 7–9

Three formulations were made to compare encapsulated catalysts prepared by rotating disk to encapsulated catalysts prepared according to the disclosure of WO 98/11166 and by spray drying. Model Formulation 1 was used as the basis for the testing. Samples were mixed by hand until the resin and plasticizer were homogeneous and the capsules were well dispersed. The encapsulating agent is a $C_{22}$ side chain polyacrylate polymer having a weight average molecular weight of 12,000 and a number average molecular weight 7,000. The catalyst is dibutyl tin acetyl bis(acetonate) sold under the Trademark and Designation of Neostann 220 by Nitto. The particles contained 80 percent by weight of encapsulating agent and 20 percent by weight of catalyst. The theoretical tin level of the encapsulated tin particles was 5.5 percent by weight. In Example 7 the encapsulated catalyst was prepared using the process as described in Example 5. In Example 8 the encapsulated catalyst was prepared using the process described in WO 98/11166 see Examples 1 and 4. In Example 9 a spray drying process prepared the encapsulated catalyst.

Each sample was tested for tin level, particle size, reactivity, stability and extractability of the catalyst. The following test procedures were used.

The elemental tin analysis was performed by the Neutron Activation Method. Samples and standards are irradiated in a neutron field to create radioactive isotopes of the elements of interest. These radioactive isotopes decay by the emission of gamma radiation characteristic of the activated elements. In the case of tin, two isotopes emit gamma rays with energies of 160 and 332 KeV. The half-lives of these two isotopes are 40.1 and 9.6 minutes, respectively. Following some decay period, the gamma radiation spectra from each of the samples and standards are measured using high purity germanium detectors. After correcting for decay of the radioactive isotopes, the peak areas of the gamma rays of interest (i.e. 160 and 332 KeV) are compared to those of a standard of known concentration. The ratio of the peak areas is then used to calculate the concentration of the element of interest in the sample.

Known amounts of each sample are loaded into 2-dram polyethylene vials, dispersed in high purity graphite, and then sealed. Loading known amounts into 2-dram vials, diluting the standards to the appropriate volume with high purity water, and then sealing the vials prepare standards. The samples and standards are then irradiated for 10 minutes at a power level of 10 kilowatts in a "Lazy Susan" facility of the nuclear reactor. Following a 10 minute decay, their respective gamma radiation spectra are acquired for 400 seconds using two high purity germanium detectors using a computer-based multi-channel analyzer. Tin concentrations are calculated using Canberra™ software and standard comparative techniques. The following nuclear reactions were used for the determination of tin in the catalyst samples;

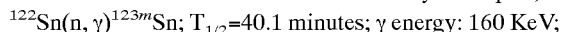
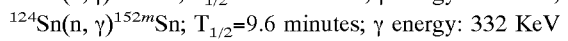

Particle sizes were determined by using a Horiba LA 910 Laser Scattering Particle Size Analyzer. Samples were prepared by dispersing the capsules in Isopar G with 0.1% Aerosol OT 100. Samples were sonicated to break up the agglomerates.

Particle sizes of samples were also analyzed using a light obscuration based particle size analyzer. The equipment included a Climet CI-1000 signal processor and either an RLV2-100EH or RLV5-250EH sensor. The samples were prepared by taking approximately 0.15 gram of material and placing it in a 25 ml vial. 3–5 ml of 1% Triton X-100 in isopropanol was added to the dry powder to wet the particles. The dispersion was then sonicated for approximately 30 seconds to break up any agglomerate. Approximately 20 ml of water were then added to the dispersion to further dilute it. The dispersion was passed through a 250-micron (60-mesh) sieve to remove any large particles and it is reported whether or not large particles are found on the sieve. Approximately 0.1 ml of the dilute dispersion that passed through the sieve was added to approximately 225 ml of water and this final dispersion was delivered to a light obscuration based particle size analyzer, i.e., a Climet CI-1000 equipped with a sensor. The accuracy of the measurement was evaluated by analyzing monodisperse samples of polystyrene spheres.

For reactivity studies, approximately 2–2.5 g samples of formulations are poured into 1.4 g aluminum weighing pan. Activation of the capsules is accomplished by placing the pan on a hot plate heated to 100°0 C. for 2.5 minutes. Sample is then stored on a lab bench at ambient conditions and monitored for gelation. The time for a gel to form after activation is recorded.

For stability studies, approximately 2–2 g samples of formulations are poured into 1.4 g aluminum weighing pan. Samples were placed in an oven set at 85° F. The time for a gel to form is recorded.

The recipe to perform extraction studies is 10 parts by weight of capsules and 90 parts by weight of heptane. Capsules and heptane were added to an Erlenmeyer flask. The dispersion of capsules was mixed at room temperature in a capped flask equipped with a magnetic stirrer bar for 30 minutes. The sample was filtered on a Buchner funnel that had a disk of No. 1 Whatman filter paper, dried and analyzed for tin.

Table 1 shows the elemental tin analysis for each of the samples.

TABLE 1

| Example | Description | Elemental Tin, % |
|---|---|---|
| 8 | Air Milled | 5.78 ± 0.1 |
| 9 | Spray Dried | 5.43 ± 0.1 |
| Example 7 | Rotating Disk | 5.48 ± 0.06 |

Table 2 tabulates the particle sizes of the capsules as determined by. A light obscuration based particle size analyzer as described above

TABLE 2

Particle Size of the Capsules

| Example | Description | No. Ave., µm | Area Ave., µm | Vol. Ave., µm | Vol. Median, µm |
|---|---|---|---|---|---|
| 8 | Air milled | 9.0 | 20.0 | 49.5 | 27.7 |
| 9 | Spray Dried | 10.6 | 40.7 | 108.2 | 67.4 |
| 7 | Rotating Disk | 22.5 | 49.6 | 61.0 | 59.7 |

Example 8 (air milled) and Example 9 (spray dried) had significant amounts of particles that were retained on a 250 mm sieve. In particular, Samples of Example 8 had very large particles present. Example 7 prepared by the rotating disk method has a narrower particle size distribution than either of the other two samples. Overall, the rotating disk sample has a much lower fraction of particles greater than 250 microns.

The particle size of the comparative encapsulated catalysts used were also determined using a Horiba LA 910 Laser Scattering particle size analyzer by dispersing the powder in Isopar G with 0.1 Aerosol OT 100. The samples were sonicated to break up agglomerated particles. The results are compiled in Table 3.

TABLE 3

| Example | Description | Run 1 | Run 2 | Run 3 |
|---|---|---|---|---|
| 8 | Air milled | 48 | 52 | 31 |
| 9 | Spray Dried | 41 | 46 | 51 |

Table 4 shows a performance comparison in terms of both reactivity and stability of the encapsulated catalyst.

TABLE 4

| Example | Description | Reactivity, min | Stability, Days |
|---|---|---|---|
| 8 | Air Milled | <2 | <<0.25 |
| 9 | Spray Dried | <90 | <2 |
| 7 | Rotating Disk | 0* | >21 |

*Gelled on hot plate

A comparison of the results shows that the sample of Example 7 prepared by the rotating disk process clearly has better stability and reactivity than either of the samples prepared by air milling (Example 8) or spray drying (Example 9).

Table 5 shows the results of the extraction studies.

TABLE 5

| Example | Description | Tin % Before Washing | Tin % After Washing | Tin Lost % | Stability days |
|---|---|---|---|---|---|
| 8 | Air milled | 5.78 ± 0.1 | 3.77 ± 0.05 | 35 | <<0.25 |
| 9 | Spray Dried | 5.43 ± 0.1 | 5.14 ± 0.09 | 7 | <2 |
| 7 | Rotating Disk | 5.48 ± 0.06 | 5.59 ± 0.09 | 0 | >21 |

Heptane is a good solvent for Neostann U-220 tin catalyst; but, a poor solvent for the Intelimer 8065 side chain crystalline acrylate polymer. Thus, washing capsules with heptane is expected to either remove tin catalyst remaining on the capsule surface or extract tin from the capsule interior. Based on this, a correlation is expected between these test results and the stability of the formulations. The best stability (>21 days) is obtained with the Example 7 (rotating disk) sample which also has the lowest level of lost tin. The results demonstrate that preparation of capsules according to Example 7 (rotating disk) is superior to the preparation according to Example 8 or 9 (air milling or spray drying methods).

The particle size distribution is narrower with a lower fraction of particles greater than 250 microns for the Example 7 (rotating disk) sample. The reactivity is greater for the Example 7 (rotating disk) sample with cure being obtained on the hot plate in this series of experiments. Example 8 (air milled) sample had reactivity approaching that for the Example 7 (rotating disk) sample. Example 9 (spray dried) sample had much lower reactivity. The stability of the Example 7 sample prepared by rotating disk is better than either Example 8 (air milled) or Example 9 (spray dried) samples. Example 9 (spray dried) sample had stability that was superior to Example 8 (air milled) sample. The combination of stability and reactivity was best for the Example 7 (rotating disk) sample, excelling the performance either Example 8 (air milled) or Example 9 (spray dried) sample in both reactivity and stability studies. The performance of Example 8 and 9 indicates that the two process techniques used for their preparation give a tradeoff in performance between stability and reactivity. This difference correlates with particle size. That is, the larger particles prepared according to Example 9 (spray drying) have lower reactivity and higher stability than the particles prepared according to Example 8 (air milled). There is a correlation between reactivity and extractable tin catalyst. The very low levels of extractable tin obtained in Example 7 (rotating disk) correlate with much greater stability.

EXAMPLE 10

Synthesis of Silylated Prepolymer

A polyether silylated prepolymer was prepared by thoroughly mixing 2366.2 grams 0.388 eq. of polypropylene glycol diol having hydroxyl equivalent weight of 6100 with 83.8 grams (0.409 eq.) of isocyanatopropyl trimethoxysilane. The reaction was carried out in a reaction vessel at 75° C. under nitrogen blanket for about 4 hours until no isocyanate groups could be detected by infrared analysis. 1050 grams of dialkyl phthalate plasticizer containing mixed $C_7$-,$C_9$- and C11-linear alkyl group was added to the mixture and thoroughly mixed. The viscosity of the reaction mixture at 23° C. was 17,700 cps.

EXAMPLE 11

Synthesis of Silylated Prepolymer

A polyether silylated prepolymer was prepared by thoroughly mixing 2,355.4 grams (0.438 eq.) of polypropylene glycol triol having hydroxyl equivalent weight of 5,373 with 94.7 grams (0.462 eq.) of isocyanatopropyl trimethoxysilane. The reaction was carried out in a reaction vessel at 75° C. under nitrogen blanket for about 4 hours until no isocyanate groups could be detected by infrared analysis.

1,050 grams of the dialkyl phthalate plasticizer were added to the mixture and thoroughly mixed. The viscosity of the reaction mixture at 23° C. was 67,800 cps.

EXAMPLES 12–15

Polyether silylated prepolymers were prepared by reacting mixed diols containing polypropylene glycol diols having hydroxyl equivalent weights of 6, 100 and 1,000 with isocyanatopropyl trimethoxysilane. The reaction was carried out in a reaction vessel by first heating to 75° C., then to 85° C. under nitrogen blanket for about 4 hours until no isocyanate groups could be detected by infrared analysis. A dialkyl phthalate plasticizer was added to each mixture and thoroughly mixed. The amounts of the reactants, the plasticizer used and viscosity data are listed below:

TABLE 6

| | Example 12 | Example 13 | Example 14 | Example 15 |
|---|---|---|---|---|
| Polypropylene glycol diol, ew = 6100 | 950 | 900 | 850 | 800 |
| Polypropylene glycol diol, ew = 1000 | 50 | 100 | 150 | 200 |
| Isocyanatopropyl trimethoxysilane | 45.9 | 54.9 | 54.6 | 72.8 |
| Dialkyl phthalate Plasticizer | 448 | 452 | 456 | 460 |
| Total | 1493.9 | 1506.9 | 1510.6 | 1532.8 |
| Viscosity, 23° C. cps | 15800 | 14290 | 11600 | 9760 |

EXAMPLES 16–19

Compounding of the Prepolymers

The silylated prepolymers described above were compounded with vinyl trimethoxysilane, gamma-glycidoxypropyltrimethoxysilane, catalyst and carbon black. The prepolymers, vinyl trimethoxysilane, gamma-glycidoxypropyltrimethoxysilane, catalyst were charged to a 2 gallon planetary mixer and mixed for 20 minutes under vacuum, then dried carbon black was added and mixed for 20 minutes under vacuum. Finally, the adhesive was filled into plastic tubes. Compositions and physical properties of some adhesives prepared listed in Table 7

EXAMPLES 16–19

TABLE 7

|  | Example 16 | Example 17 | Example 18 | Example 19 |
|---|---|---|---|---|
| Prepolymer in Example 10 | 1169.6 | 877.2 | 584.8 | 292.4 |
| Prepolymer in Example 11 | 0.0 | 292.4 | 584.8 | 877.2 |
| Vinyl trimethoxysilane | 16.0 | 16.0 | 16.0 | 16.0 |
| gamma-Glycidoxy propyltrimethoxy-silane | 11.2 | 11.2 | 11.2 | 11.2 |
| Dibutyl tin bis(acetylacetonate) | 3.2 | 3.2 | 3.2 | 3.2 |
| Carbon black | 400.0 | 400.0 | 400.0 | 400.0 |
| Total | 1600.0 | 1600.0 | 1600.0 | 1600.0 |
| Tensile strength, psi | 683 | 610 | 512 | 470 |
| Elongation, % | 351 | 299 | 222 | 191 |
| Storage modulus, 25° C. | 10.23 | 8.12 | 7.22 | 4.72 |
| Cure rate, 23° C., 50% RH |  |  |  |  |
| 3 hours | 15.8 | 35.8 | 75.4 | 87.1 |
| 6 hours | 43.7 | 69.5 | 137.6 | 140.3 |

EXAMPLES 20–23

Adhesives were prepared according to Example 18–19. The components and results of testing are compiled in Table 8.

TABLE 8

|  | Example 20 | Example 21 | Example 22 | Example 23 |
|---|---|---|---|---|
| Prepolymer in Example 12 | 1169.6 | 0.0 | 0.0 | 0.0 |
| Prepolymer in Example 13 | 0.0 | 1169.6 | 0.0 | 0.0 |
| Prepolymer in Example 14 | 0.0 | 0.0 | 1169.6 | 0.0 |
| Prepolymer in Example 15 | 0.0 | 0.0 | 0.0 | 1169.6 |
| Vinyl trimethoxysilane | 16.0 | 16.0 | 16.0 | 16.0 |
| gamma-Glycidoxypropyl-trimethoxysilane | 11.2 | 11.2 | 11.2 | 11.2 |
| Dibutyl tin bis(acetyl-acetonate) | 3.2 | 3.2 | 3.2 | 3.2 |
| Carbon black | 400.0 | 400.0 | 400.0 | 400.0 |
| Tensile strength, psi |  | 572 |  |  |
| Elongation, % | 230 | 214 | 173 | 159 |
| Modulus | 12.11 | 13.03 | 14.88 | 12.52 |
| Cure rate, 23° C., 50% RH |  |  |  |  |
| 3 hours | 7.7 | 10.0 | 11.3 | 8.9 |
| 6 hours | 33.0 | 43.6 | 48.0 | 32.6 |

EXAMPLE 24

To a 2-gallon planetary mixer were charged, 1,100 grams of silylated prepolymer prepared according to Example 10, 17 grams of gamma-glycidoxypropyltrimethoxy silane (Silquest A-187 from Witco) and 11 grams of vinyl trimethoxy silane (Silquest A-171 from Witco). The mixture was degassed for 15 minutes under vacuum. After this, 443 grams of carbon black, CSX-316, were added to the mixture and the mixture was mixed for 5 minutes under no vacuum, followed by an extra 15 minutes of mixing under vacuum. Finally, 11.9 grams of encapsulated catalyst prepared as described in Example 5 were added to the mixture and the mixture was mixed for 15 minutes under vacuum.

EXAMPLE 25

To a 2-gallon planetary mixer were charged, 1100 grams of silylated prepolymer Example 11, 17 grams of gamma-glycidoxypropyltrimethoxy silane (Silquest A-187 from Witco) and 11 grams of vinyl trimethoxy silane (Silquest A-171 from Witco). The mixture was degassed for 15 minutes under vacuum. After this, 443 grams of carbon black, CSX-316, were added to the mixture, and the mixture was mixed for 5 minutes under no vacuum, followed by an extra 15 minutes mixing under vacuum. Finally, 7.9 grams of encapsulated catalyst prepared as described in Example were added to the mixture and the mixture was mixed for 15 minutes under vacuum.

EXAMPLE 26

To a 2-gallon planetary mixer, 707 grams of Kaneka silylated prepolymer S303H, 17 grams of gamma-glycidoxypropyltrimethoxy silane (Silquest A187 from Witco) and 11 grams of vinyl trimethoxy silane (Silquest A-171 from Witco) were charged. The mixture was degassed for 15 minutes under vacuum. After this, 443 grams of carbon black, CSX-316, were added to the mixture, and the mixture was mixed for 5 minutes under no vacuum, followed by an extra 15 minutes mixing under vacuum. Finally, 38.2 grams of encapsulated catalyst prepared as described in Example 5 were added to the mixture and the mixture was mixed for 15 minutes under vacuum.

EXAMPLES 24, 25 AND 26

Performance of Cure on Demand Adhesives

The adhesives prepared in Examples 24, 25, and 26 were exposed to ambient conditions for various days. After exposure, the adhesive was heated under an IR heater for a total heating time of 140 seconds, followed by 6 minutes cooling at ambient condition and then decked to an E-coat panel primed with a standard body primer. Each adhesive composition was allowed to fully cure at ambient condition. Each sample, after being exposed to ambient conditions before activation and curing for from 0 to 7 days, demonstrated 100 percent cohesive failure after activation according to the quick knife adhesion test after 7 days cure of each sample. The results are compiled in Table 9.

TABLE 9

Physical properties of Examples 24, 25 and 26

| Example | Lap shear strength, psi | Tensile strength, psi | Elongation % |
|---|---|---|---|
| 24 | 311 | 499 | 375 |
| 25 | 318 | 495 | 370 |
| 26 | 288 | N/A | N/A |

EXAMPLE 27

Polyether silylated prepolymers were prepared in a similar way as those described in the Example 10 by varying the equivalent ratio of NCO to OH. The polyether diol used had a hydroxyl equivalent weight of 8019. The ratios of NCO/OH used were 1.05, 0.95, 0.85 and 0.75. The prepolymers were then compounded into moisture curable sealants in the same way as described in Examples 16 to 19. Tensile strength and elongation were obtained from the samples cured for 7 days at 23° C. and 50 percent humidity. The physical property data vs. NCO/OH ratios are shown below in Table 10.

TABLE 10

| NCO/OH Ratio | Tensile Strength, psi | Elongation, percentage |
|---|---|---|
| 1.05 | 788 | 480 |
| 0.95 | 733 | 400 |
| 0.85 | 1002 | 471 |
| 0.75 | 1441 | 513 |

Open Stability of silylated prepolymers improved by addition of an acid.

EXAMPLE 28

A polyether silylated prepolymer was prepared as described in Example 10 using NCO/OH index of 1.05. The polyether diol used had a hydroxyl equivalent weight of 8500 and basicity of 0.029 meq./g. The prepolymer was neutralized with a reagent of 5–6 N HCl in isopropanol (supplied by ACROS Organics, actual HCl concentration was 4.1 N by titration). The acidity of the final prepolymer was determined to be 0.27 meq./100 g.

Open stability testing of the prepolymer was carried out in a chamber in the condition of 30° C. and 80 percent RH.

The samples with and without neutralization were placed each in an 8 oz glass jar, then subjected to the test condition. Viscosity was determined with a Blookfield Viscosmeter after the samples were cooled to ambient temperature. Stability was measured by viscosity growth of the prepolymer over the exposure time. The stability data for the prepolymers with and without neutralization open to the 30° C. and 80 percent relative humidity are shown in the Table 11.

TABLE 11

| | Days exposed | | | | |
|---|---|---|---|---|---|
| | 0 | 8 | 12 | 15 | 19 | 22 |

Prepolymer without Neutralization

| Viscosity, cps | 34400 | 70900 | 147200 | | | |
|---|---|---|---|---|---|---|
| Temperature C. | 23.6 | 24 | 21.7 | Gelled | | |
| % Growth | — | 106.1 | 327.9 | | | |

TABLE 11-continued

| | Days exposed | | | | | |
|---|---|---|---|---|---|---|
| | 0 | 8 | 12 | 15 | 19 | 22 |

Prepolymer with Neutralization

| Viscosity, cps | 36300 | 35000 | 38000 | 35100 | 35700 | 36100 |
|---|---|---|---|---|---|---|
| Temperature C. | 23.1 | 23.8 | 21.3 | 24 | 24.2 | 24.5 |
| % Growth | — | −3.6 | 4.7 | −3.3 | −1.7 | −0.6 |

EXAMPLES 29–33

Several adhesives were prepared according to the description of Examples 18 to 19 using the following materials.

Kaneka SAX-400 methoxysilyl-terminated polypropyleneoxide based polyether which is a trifunctional polymer wherein the terminal groups are dimethoxymethyl silyl groups having a molecular weight as quoted by the Kaneka of about 20,000 as determined according to functional analysis.

Kaneka SAX-720 methoxysilyl-terminated polypropyleneoxide based polyether which is a difunctional polymer wherein the terminal groups are dimethoxymethyl silyl groups having a molecular weight as quoted by the Kaneka of about 20,000 as determined according to functional analysis.

Kaneka SAX-725 methoxysilyl-terminated polypropyleneoxide based polyether which is a difunctional polymer wherein the terminal groups are dimethoxymethyl silyl groups having a molecular weight as quoted by the Kaneka of about 25,000 as determined according to functional analysis.

Plasticizer a linear alkyl mixed alkyl ($C_7$, $C_9$, $C_{11}$) phthalate available from BASF as Platinol S711.

Adhesion promoter gamma-glycidoxy propyl trimethoxy silane.

Heat stabilizer Bis(1,2,2,6,6,-pentamethy-4 piperidinyl) sebacate (Tinuvin 765 heat stabilizer)

Encapsulated catalyst prepared as described in Example 5 having a catalyst loading of 20 percent.

Carbon Black.

The formulations are described in Table 12 hereinafter. Each formulation was tested for stability by checking for tackiness at 0, 3 and 5 days at 23° C. and 50 percent humidity; at 3 days after exposure to 30° C. and 80 percent humidity; and after 3 days at 40° C. The adhesives were applied to a substrate coated with a coating of an acrylic melamine modified with an acrylic silane (commonly known as Gen IV paint) and subjected to the conditions described above cured under the following conditions and the lapshear testing was performed on the samples. Cure rate testing was performed on the samples after exposure to temperatures of 23° C. and 50 percent relative humidity at 3, 6 and 24 hours. The hardness of the samples was determined under the following conditions. The results are compiled in Table 12.

TABLE 12

| | Example | | | | |
|---|---|---|---|---|---|
| Component | 29 pph | 30 pph | 31 pph | 32 pph | 33 pph |
| Prepolymer SAX 400 | 40.5 | 27 | 13.5 | 40.5 | 13.5 |
| Prepolymer SAX 725 | 13.5 | 27 | 40.5 | 0 | 0 |

TABLE 12-continued

| | Example | | | | |
|---|---|---|---|---|---|
| Component | 29 pph | 30 pph | 31 pph | 32 pph | 33 pph |
| Prepolymer SAX 720 | 0 | 05 | 0 | 13.5 | 13.5 |
| Ration of Diol to Triol | 3:1 | 1:1 | 1:3 | 3:1 | 1:3 |
| Plasticizer | 15 | 15 | 15 | 15 | 15 |
| Adhesion promoter | 1 | 1 | 1 | 1 | 1 |
| Heat Stabilizer | 1 | 1 | 1 | 1 | 1 |
| Catalyst | 2 | 2 | 2 | 2 | 2 |
| Carbon Black | 27 | 27 | 27 | 27 | 27 | pph means parts per hundred

TABLE 13

| | Example | | | | |
|---|---|---|---|---|---|
| Test | 29 | 30 | 31 | 32 | 33 |
| Stability 23° C. 50% RH | >13 days tacky | >18 days tacky | >18 days tacky | >13 days tacky | >18 days tacky |
| 30° C. 80% RH | 5 day tacky, 6 day sl. tacky | 5 day tacky, 6 day sl. tacky | 5 day tacky, 6 day sl. tacky | 6 day tacky, 7 days sl tacky | 6 day tacky, 10 days sl tacky |
| 40° C. | 3 day sl tacky, 4 day TF | 3 day sl tacky, 5 day TF | 3 day sl tacky, 5 day TF | 3 day sl tacky, 5 day TF | 3 day tacky, 4–5 day sl tacky, 6 day TF |
| Adhesion 0 day at 23° C. 50% RH | 270 psi 100% CF | 342 psi 100% CF | 428 psi 100% CF | 263 psi 100% CF | 369 psi 100% CF |
| 3 day 23° C. 50% RH | 321 psi 100% CF thin | 379 psi 100% CF | 459 psi 100% CF | 311 psi 100% CF | 408 psi 100% CF |
| 5 day 23° C. 50% RH | 362 psi 100% CF thin | 439 psi 100% CF | 419 psi 100% CF | 354 psi 100% CF | 410 psi 100% CF |
| 3 day 30° C. 80% RH | 275 psi 100% CF | 204 100% CF thin | 426 psi 100% CF | 305 psi 100% CF | 348 psi 100% CF |
| 3 day 40° C. | 357 psi 100% CF | 422 psi 100% CF | 576 psi 100% CF | 381 psi 90–100% CF | 429 psi 100% CF |
| Cure Rate | 0 day open | 23° C. 50% RH | | | |
| 3 hours, psi | 42 | 34 | 26 | 40 | 23 |
| 6 hours, psi | 88 | 77 | 58 | 83 | 48 |
| 24 hours, psi | 262 | 216.5 | 166 | 285 | 157 |
| Hardness Shore A | 41 | 40 | 41 | 40 | 40 |

Sl. Tacky means slightly tacky.
TF means
CF means cohesive failure

EXAMPLES 34 TO 36

Several adhesives were prepared according to the description of Examples 16 to 19 using the components as described for Examples 29 to 33. In particular 54 parts of Kaneka SAX 400 prepolymer, 15 parts of plasticizer, 1 part of adhesion promoter, 1 part of heat stabilizer, 2 parts of encapsulated catalyst and 27 parts of carbon black. There are 100 total parts. The adhesives were tested as described before and the results are compiled in Table 14.

TABLE 14

| | Testing after Formulation | | |
|---|---|---|---|
| Example/Test | 34 | 35 | 36 |
| Stability 23° C. 50% RH | | | |
| Days Tacky | 8 | | >6 |
| Days to Slightly Tacky | | 8 | |
| Days to TF | | | |
| 30° C. 80% RH | | | |
| Days tacky | 1 | 3 | |
| Days to Slightly Tacky | 4–6 | | 3 |
| Days to TF | | 6 | 4 |
| 40° C. | | | |
| Days tacky | 1 | | |
| Days to Slightly Tacky | | 3 | 3 |
| Days to TF | 4 | 4 | 4 |
| Viscosity 1, seconds | 12.5 | 12 | 12.5 |
| Viscosity 2 centipoise | | 97400 | 98350 |
| Adhesion | | | |
| Lap Shear psi | 295 | 306 | 226 |
| Cohesive Failure % | 100 | 100 | 100 |
| 0 day | | | |
| Lap Shear psi | 320 | 223 | 226 |
| Cohesive Failure % | 100 | 100 | 100 |
| 3 day 23° C. 50% RH | gas | thin | |
| Lap Shear psi | 323 | | |
| Cohesive Failure % | 100 | | |
| 5 day 23° C. 50% RH | | | |
| Lap Shear psi | 384 | 222 | 264 |
| Cohesive Failure % | 100 | 100 gas | 100 gas |
| 3 day 30° C. 80% RH | gas | | |
| Lap Shear psi | 375 | 328 | 200 |
| Cohesive Failure % | 100 | 100 | 80–100 |
| 3 day 40° C. | | | |
| Cure Rate | | | |
| 0 day open 23° C. 50% RH | | | |
| 3 hours, psi | 38 | 27 | 29 |
| 6 hours, psi | 77 | 88 | 81 |
| 16 hours, psi | 183 | 206 | 208 |
| 24 hours, psi | >192 | 229 | 225 |
| 3 day open 23° C. 50% RH | | | |
| 3 hours, psi | 29 | 48 | 45 |
| 6 hours, psi | 86 | 105 | 97 |
| 16 hours, psi | >183 | 186 | 199 |
| 24 hours, psi | | 187 | 195 |
| 5 day open 23° C. 50% RH | | | |
| 3 hours, psi | | | |
| 6 hours, psi | | | |
| Tensile psi | 541 | 647 | 582 |
| Elongation % | 455 | 449 | 413 |
| 0 day open | | | |
| Tensile psi | | 523 | 577 |
| Elongation % | | 409 | 348 |
| 3 day open | | | |
| Tensile psi | 639 | | |
| Elongation % | 361 | | |
| 5 day open | | | |
| DMA 0 day open | | | 7.1 |
| DMA 3 day open | | | 5.9 |
| Hardness Shore A 0 day open | | 41.5 | 40 |

0 day open means without significant exposure to atmospheric conditions before testing
Sl. Tacky means slightly tacky.
TF means Tack Free
CF means cohesive failure Viscosity 1 is press flow in seconds of material forced through a circular hole with a diameter of 0.157 inches at 80 psi.

Viscosity 2 is determined using Rheometrics a 2000 Pa.

Unless otherwise stated the exposure conditions were at 23° C. and 50% relative humidity, i.e., open time exposure.

EXAMPLES 37–45

Several encapsulated active agents were prepared from various encapsulating agents and catalytic materials. The encapsulating agent's catalytic materials are listed below. In Table 15 is a list of the encapsulated active materials prepared, the loading level, particle size and process temperature. The process for preparing the particles is as described in Example 5.

Encapsulating Materials were

A. 8,000 mol. wt. Poly(ethylene glycol)
B. B lend of 95% b y weight 5,000 mol. wt. Methoxy Poly(ethylene glycol) and 5% by weight 100,000 mol. wt. Poly(ethylene oxide)
C. Blend of 98% by weight 5,000 mol. wt. Methoxy Poly(ethylene glycol) and 2% Monamide S
D. Blend of 95% by weight 8,000 Poly(ethylene glycol) and 5% by weight Poly(ethylene oxide)
E. Polywax 500 polyethylene wax Catalysts
 a. Neostann® U-220 dibutyltin bis(acetylacetonate)
 b. Dibutyltin bis(2-ethylhexanoate)

TABLE 15

| Example No. | Encap Agt. | Catalyst | Loading, % | Disk Rate RPM | Feed Rate g/min | Particle Size, micron | Process Temp. deg C. |
|---|---|---|---|---|---|---|---|
| 37 | A | A | 30 | 13,000 | 100 | 5–125 | 75 |
| 38 | A | A | 30 | 14,000 | 100 | 5–125 | 75 |
| 39 | B | A | 30 | 14,000 | 100 | <300 | 80 |
| 40 | C | A | 30 | 14,000 | 100 | <300 | 80 |
| 41 | B | A | 20 | 14,000 | 100 | <300 | 100 |
| 42 | B | B | 30 | 14,000 | 100 | <300 | 100 |
| 43 | D | A | 30 | | | 20–710 | 105 |
| 44 | B | A | 30 | 13,000 | 100 | 20–710 | 90 |
| 45 | B | A | 30 | 13,000 | 100 | 20–710 | 90 |

EXAMPLES 37 TO 43

Twenty grams each of particles of Examples 37 to 43 were extracted with a 50 grams of Heptone as described n Example 7. The capsules were subjected to analysis before and after extraction as described in Example 7. The results are compiled in Table 16. Two adhesive formulations comprising (0.35 g) of the encapsulated catalyst of Example 44 and 45 respectively were blended with Kanekas 5303 prepolymer and 2 grams of Platinol 711 plasticizer. A portion of the resulting adhesives were heated for 2.5 minutes on a hot plate at 100° C. The unextracted samples of both adhesives cured on the hot plate. Another portion of the resulting adhesive was stored at 85° F. and both formulations were stable, did not cure, for more than five days.

TABLE 16

| | Elemental Tin Content | |
|---|---|---|
| Example/Encap Agent | Unwashed, % by wt. | Washed, % by wt. |
| 40 A | 8.3 | 8.0 |
| 41 A | 8.1 | — |
| 42 B | 9.5 | 9.4 |
| 43 C | 10.0 | 9.9 |
| 44 B | 5.3 | 5.3 |
| 45 B | 5.6 | 5.5 |
| 46 D | 1.32 | |

What is claimed is:

1. An adhesive composition comprising
   a) a polymer having a reactive moiety capable of cross-linking,
   b) a particle comprising an active agent encapsulated in an encapsulating agent wherein the active agent comprises a catalyst for cross-linking of the reactive moiety, a curing agent for the reactive moiety, an accelerator for the curing reaction or a mixture thereof; and the encapsulating agent comprises crystallizable polymer wherein the active agent is soluble in the crystallizable polymer or does not volatilize at the temperature of the encapsulation process; wherein about 1 percent by weight or less of the active agent is extractable from the particle at ambient conditions during the first extraction after particle formation when the particles are contacted with a solvent for the active agent which solvent is not a solvent for the crystallizable polymer, and wherein the composition exhibits a tensile strength upon cure of about 250 psi or greater.

2. An adhesive according to claim 1 wherein the polymer is a polyurethane prepolymer having isocyanate functionality, an epoxy resin, a polyolefin having a silane moiety capable of silanol condensation or hydrosilylation, a polyether having a silane moiety capable of silanol condensation or hydrosilylation or a polyurethane having an olefinic reactive moiety.

3. An adhesive composition according to claim 1 wherein the active agent is soluble in the crystallizable polymer and does not volatilize at the temperature of the encapsulation process.

4. The adhesive composition of claim 3 wherein the active agent is an organotin compound.

5. An adhesive according to claim 4 wherein the polymer is a polyurethane prepolymer having isocyanate functionality, an epoxy resin, or a polyether having a silane moiety capable of silanol condensation.

6. An adhesive composition according to claim 4 wherein the polymer comprises
an alkylene oxide based polymer having a reactive silicon moiety bound thereto and the active agent is a silanol condensation catalyst encapsulated in an encapsulating agent having a transition point of from about 40° C. to about 250° C.

7. An adhesive composition according to claim 6 wherein the polymer comprises an alkylene oxide based polymer having a reactive silicon moiety bound thereto and the active agent is a silanol condensation catalyst encapsulated in an encapsulating agent having a transition point of from about 40° C. to about 250° C.

8. An adhesive composition according to claim 7 wherein the encapsulating agent is a side chain crystalline polymer.

9. The adhesive composition according to claim 4 wherein the active agent is dibutyltin oxide, dialkyltin bis (acetylacetonate), or the reaction product of dibutyltin oxide with a phthalic ester or pentanedione.

10. The adhesive composition according to claim 9 wherein the crystalline polymer is a side chain crystallizable polymer which comprises a polymer or copolymer of an alkyl acrylate or alkyl methacrylate wherein the polymer has substituted or unsubstituted side chains of about 6 to about 50 carbon atoms.

11. The adhesive composition according to claim 10 wherein the polymer comprises a $C_{22}$ side chain alkyl acrylate.

12. An adhesive composition according to claim 3 wherein the encapsulated active agent is prepared by the process steps of
a) contacting the active agent with the crystallizable polymer wherein the polymer is molten and the active agent is not volatile under the contacting conditions;
b) forming particles of about 3000 microns or less; and
c) exposing the particles to conditions such that the portion of the particle at and near the surface undergoes rapid solidification such that the particle formed has a different crystal structure at and near the surface of the particle.

13. An adhesive composition according to claim 3 wherein the encapsulated active agent is prepared according to the process which comprises heating a crystallizable polymer under conditions such that the polymer is molten; contacting an active agent with the molten polymer to dissolve the active agent within the polymer; pouring the active agent dissolved in the polymer on a rotating disk such that particles of the active agent in the polymer are formed, spun from the disk and solidified.

14. An adhesive composition according to claim 1 which further comprises an encapsulated adhesion promoter.

* * * * *